US008775303B2

(12) United States Patent
Higgins et al.

(10) Patent No.: US 8,775,303 B2
(45) Date of Patent: Jul. 8, 2014

(54) SYSTEMS AND METHODS FOR VALIDATING AN ORDER PURCHASED WITH AN UNSPECIFIED TERM

(76) Inventors: Matt Higgins, Holden, MA (US); Tyler Brooks, Seattle, WA (US)

( * ) Notice: Subject to any disclaimer, the term of this patent is extended or adjusted under 35 U.S.C. 154(b) by 89 days.

(21) Appl. No.: 13/085,005

(22) Filed: Apr. 12, 2011

(65) Prior Publication Data

US 2012/0265671 A1    Oct. 18, 2012

(51) Int. Cl.
 *G06Q 40/00* (2012.01)
(52) U.S. Cl.
 USPC .................................................. 705/39
(58) Field of Classification Search
 USPC ..................................... 705/35–40
 See application file for complete search history.

(56) References Cited

U.S. PATENT DOCUMENTS

| 6,889,098 | B1 * | 5/2005 | Laval et al. ........................ 700/19 |
| 2002/0116235 | A1 * | 8/2002 | Grimm et al. ..................... 705/5 |
| 2004/0158482 | A1 * | 8/2004 | Hale et al. ........................ 705/5 |
| 2004/0220821 | A1 | 11/2004 | Ericsson et al. |
| 2006/0031178 | A1 | 2/2006 | Lehrman et al. |
| 2007/0282667 | A1 | 12/2007 | Cereghini et al. |
| 2008/0270280 | A1 | 10/2008 | Major et al. |
| 2009/0307154 | A1 | 12/2009 | Carter, III |
| 2010/0106587 | A1 | 4/2010 | Walker et al. |
| 2011/0082759 | A1 | 4/2011 | Swinson et al. |

OTHER PUBLICATIONS

International Search Report and Written Opinion issued Oct. 16, 2012 in PCT Application No. PCT/US2012/32597.

* cited by examiner

*Primary Examiner* — Olabode Akintola
(74) *Attorney, Agent, or Firm* — Foley & Lardner LLP; Christopher J. McKenna; Daniel Rose

(57) ABSTRACT

The present invention is directed towards systems and methods for validating an order purchased with an unspecified term. The order may comprise an order for an access ticket or admission ticket or access token, an order for goods or services, or any combination of access, goods, and services. Validation may comprise determining the ticket or token is valid and/or allowing access based on a determined data value for an access term unspecified at the time of purchase; or determining that the order is valid and fulfilling the order based on an identified data value for a term unspecified at the time of purchase. A data value may be set for the unspecified term and a hierarchical tree searched for a leaf corresponding to the set value for the unspecified term and one or more terms specified at time of purchase, the existence of the leaf indicating the order is valid.

29 Claims, 18 Drawing Sheets

SYSTEMS AND METHODS FOR VALIDATING AN ORDER PURCHASED WITH AN UNSPECIFIED TERM

FIELD OF THE INVENTION

The present application generally relates to dynamic pricing. In particular, the present application relates to systems and methods for dynamically pricing items to balancing a business margin and target customer value, validating purchases made with unspecified terms, and providing extended discounted pricing of an order.

BACKGROUND OF THE INVENTION

Items, whether tangible or intangible goods, or access to attractions, events, venues, or other services, may be priced by a vendor, agent, broker or retailer based on a cost or expense and a desired profit margin or markup. At the expense of profit, discounts may be provided to purchasers of the items, typically to encourage greater demand. Typically, these discounts are applied as a flat percentage across all items. This is practical, because the profit margin is typically also applied as a flat percentage. For example, regardless of each individual item's cost, if a vendor prices different items with a 50% markup, the vendor can then grant a 10% discount without fear that the discounted price will be less than cost.

However, particularly where a broker or agent is selling items from multiple vendors, each item may have a different markup, determined by a net price the broker or agent has to pay to the vendor when each item is sold and a retail price set by the vendor. For example, a first item may have an 80% markup, while a second item may have a 20% markup. Because the items may have wildly different net and retail prices, the cash value of the markups may be unpredictable. For example, a large markup on an inexpensive item may be negligible compared to a small markup on a very expensive item.

Accordingly, a non-intelligent system that applies the same discount across all items may result in some items being priced below cost or below a desired profit margin. As a result, retailers using such non-intelligent systems may not be able to balance customer discounts against desired business goals or margins. Conversely, in some instances, a discount applied across items with widely different costs and retail prices may result in a sale price that represents only a negligible discount for the customer and greater profits than are required by the retailer. However, without an intelligent system able to balance these costs and prices, additional price reductions cannot be easily passed on to the customer.

BRIEF SUMMARY OF THE INVENTION

The present application is directed towards systems and methods for dynamically pricing items to balancing a business margin and target customer value, validating purchases made with unspecified terms, and providing extended discounted pricing of an order.

In one aspect, the present application is directed to a method for balancing a business margin against a target customer value to fulfill a request to purchase a plurality of items. The method includes calculating, by a dynamic pricing engine executed by a computing device, an initial sale price for a request to purchase a plurality of items from a user, each item having a retail price and a predetermined net price, the initial sale price based on a sum of the retail prices for the plurality of items, discounted by a predetermined target customer value. The method also includes determining, by the dynamic pricing engine, an initial business margin for the request, the initial business margin based on the sum of the retail prices for the plurality of items minus a sum of the predetermined net prices for the plurality of items. The method further includes adjusting, by the dynamic pricing engine, the initial sale price to create an intermediate sale price, responsive to the initial business margin being outside a range defined by a lower business margin threshold and an upper business margin threshold. The method also includes comparing, by the dynamic pricing engine, the intermediate sale price to the initial sale price to create a final sale price.

In one embodiment, the method includes transmitting, by the computing device to the user, a response to the request to purchase the plurality of items, the response including the final sale price. In another embodiment, the method includes increasing the initial sale price such that a recalculated business margin is equal to the lower business margin threshold, responsive to the initial business margin being below the lower business margin threshold. In still another embodiment, the method includes decreasing the initial sale price such that a recalculated business margin is equal to the upper business margin threshold, responsive to the initial business margin being above the upper business margin threshold.

In some embodiments, the method includes adjusting the intermediate sale price to equal the initial sale price, responsive to the intermediate sale price exceeding the initial sale price. In other embodiments, the method includes applying a predetermined volume discount to the initial sale price, prior to adjusting the initial sale price to create an intermediate sale price, the predetermined volume discount corresponding to the number of items in the plurality of items. In some embodiments, each item of the plurality of items has a first price, a second price, and a predetermined minimum volume value, and the retail price for each item comprises (i) said item's first price if the number of items in the plurality of items is less than said item's predetermined minimum volume value; or (ii) said item's second price if the number of items in the plurality of items is at least said item's predetermined minimum volume value.

In one embodiment, the method includes determining a customer savings amount based on the final sale price and a sum of the retail prices for the plurality of items; and transmitting, by the computing device to the user, the customer savings amount. In another embodiment, the plurality of items are attractions and the request is a request to purchase an access ticket. In still another embodiment, a first business margin for a first item of the plurality of items is different from a second business margin for a second item of the plurality of items.

In another aspect, the present application is directed to a system for balancing a business margin against a target customer value to fulfill a request to purchase a plurality of items. The system includes a device and a dynamic pricing engine executed by the device. The dynamic pricing engine is configured to calculate an initial sale price for a request from a user to purchase a plurality of items, each item having a retail price and a predetermined net price, the initial sale price based on a sum of the retail prices for the plurality of items, discounted by a predetermined target customer value. The dynamic pricing engine is further configured to determine an initial business margin for the request, the initial business margin based on the sum of the retail prices for the plurality of items minus a sum of the predetermined net prices for the plurality of items. The dynamic pricing engine is also configured to adjust the initial sale price to create an intermediate sale price, responsive to the initial business margin being outside a range defined by a lower business margin threshold and an upper business margin threshold. The dynamic pricing engine is further configured to compare the intermediate sale price to create a final sale price by comparing the intermediate sale price to the initial sale price.

In some embodiments, the dynamic pricing engine is configured to adjust the initial sale price by increasing the initial sale price such that a recalculated business margin is equal to the lower business margin threshold, responsive to the initial business margin being below the lower business margin threshold. In other embodiments, the dynamic pricing engine is configured to adjust the initial sale price by decreasing the initial sale price such that a recalculated business margin is equal to the upper business margin threshold, responsive to the initial business margin being above the upper business margin threshold. In still other embodiments, the dynamic pricing engine is configured to validate the intermediate sale price against the predetermined target customer value by adjusting the intermediate sale price to equal the initial sale price, responsive to the intermediate sale price exceeding the initial sale price.

In one embodiment, the dynamic pricing engine is further configured to apply a predetermined volume discount to the initial sale price, prior to adjusting the initial sale price to create an intermediate sale price, the predetermined volume discount corresponding to the number of items in the plurality of items. In some embodiments, each item of the plurality of items has a first price, a second price, and a predetermined minimum volume value, and the retail price for each item comprises (i) said item's first price if the number of items in the plurality of items is less than said item's predetermined minimum volume value; or (ii) said item's second price if the number of items in the plurality of items is at least said item's predetermined minimum volume value.

In some embodiments, the dynamic pricing engine is configured to determine a customer savings amount based on the final sale price and a sum of the retail prices for the plurality of items; and the computing device is further configured to transmit, to the user, the customer savings amount. In other embodiments, the plurality of items are attractions and the request is a request to purchase an access ticket. In still other embodiments, a first business margin for a first item of the plurality of items is different from a second business margin for a second item of the plurality of items.

In another aspect, the present application is directed to a method of validating an access ticket to an attraction. The method includes receiving, by a first device, a request to validate an access ticket to an attraction, the request including a ticket identification and an attraction identification, the access ticket having been purchased with at least one unspecified access term. The method also includes setting, by a validation engine executed by the first device, responsive to receiving the request, a data value for the at least one unspecified access term. The method further includes determining, by the validation engine and based on the set data value for the at least one unspecified access term, that access is permitted to the attraction identified by the attraction identification. The method also includes transmitting, by the first device and responsive to the determination, a validation response to validate the access ticket to the attraction.

In some embodiments, the method includes retrieving, by the validation engine, a purchase record associated with the ticket identification; and identifying, by the validation engine, from the purchase record, that the ticket was purchased without specifying a data value for the at least one unspecified access term. In other embodiments, a specified data value for the at least one unspecified access term is required for validation. In still other embodiments, the at least one unspecified access term comprises an undefined entry time, an undefined entry day of the week, or an undefined entry date.

In one embodiment, the method includes determining to pay a predetermined net price to an operator of the attraction, the predetermined net price based on the set data value for the at least one unspecified access term. In another embodiment, the method includes storing, in a purchase record associated with the ticket identification, an indicator that the access ticket has been used to access the attraction.

In still another embodiment, the method includes determining that an access contract including the set data value for the at least one unspecified access term exists for the attraction identified by the attraction identifier. In a further embodiment, the method includes searching a hierarchical tree for a leaf node corresponding to the set data value for the at least one unspecified access term. In a still further embodiment, the at least one unspecified access term comprises an entry time and the set data value for the entry time is the current time, and the leaf node of the hierarchical tree includes a start time and an end time defining a time range including the current time. In yet another further embodiment, the hierarchical tree is based on one or more access terms defining nodes, the access terms including a time range of the contract, a day of the week of the contract, and a date range of the contract.

In another aspect, the present application is directed to a method of delivering an access token. The method includes receiving, by a first device, a request for delivery of an access token, the access token purchased without specifying a data value of an access term, validity of the access token dependent on the data value of the access term. The method further includes identifying, by the first device and responsive to receipt of the request, the data value for the access term. The method also includes determining, by the first device and based on the identified data value for the access term, that the access token is valid. The method further includes delivering, by the first device and responsive to the determination, the access token.

In one embodiment, the method includes receiving a request for access to a location or service. In another embodiment, the access term comprises one of a time of access, a day of access, and a date of access. In still another embodiment, the method includes identifying a current data value for the access term. In still yet another embodiment, the method includes receiving the data value for the access term, the data value set subsequent to purchase of the access token.

In some embodiments, the method includes determining that the identified data value falls within a first predetermined range. In a further embodiment, the predetermined range is identified in an access contract. In other embodiments, the method includes identifying a first access contract of a plurality of access contracts, the first access contract comprising a predetermined range including the identified data value.

In still other embodiments, the access token comprises an approval for access to a location or service. In yet still other embodiments, the method includes receiving, by the first device, a second request for delivery of a second access token, the second access token purchased without specifying the data value of the access term; identifying, by the first device and responsive to receipt of the second request, a second data value for the access term; determining, by the first device and based on the identified second data value for the access term, that the access token is invalid; and denying, by the first device and responsive to the determination, delivery of the second access token.

In still another aspect, the present application is directed to a system for validating an access ticket to an attraction. The system includes a first device executing a validation engine, the first device configured to: (i) receive a request to validate an access ticket to an attraction, the request including a ticket identification and an attraction identification, the access ticket having been purchased with at least one unspecified access term; and (ii) transmit a validation response to validate the access ticket to the attraction. The validation engine is configured to set a data value for the at least one unspecified access term, and determine, based on the set data value for the at least one unspecified access term, that access is permitted to the attraction identified by the attraction identification.

In one embodiment, the validation engine is further configured to retrieve a purchase record associated with the ticket identification; and identify, from the purchase record, that the ticket was purchased without specifying a data value for the at least one unspecified access term. In another embodiment, a specified data value for the at least one unspecified access term is required for validation. In still another embodiment, the at least one unspecified access term comprises an undefined entry time, an undefined entry day of the week, or an undefined entry date.

In some embodiments, the validation engine is further configured to initiate payment of a predetermined net price to an operator of the attraction, the predetermined net price based on the set data value for the at least one unspecified access term. In other embodiments, the validation engine is further configured to store, in a purchase record associated with the ticket identification, an indicator that the access ticket has been used to access the attraction.

In one embodiment, the validation engine is further configured to determine that an access contract including the set data value for the at least one unspecified access term exists for the attraction identified by the attraction identifier. In a further embodiment, the validation engine is further configured to search a hierarchical tree for a leaf node corresponding to the set data value for the at least one unspecified access term. In a still further embodiment, the at least one unspecified access term comprises an entry time and the set data value for the entry time is the current time, and the leaf node of the hierarchical tree includes a start time and an end time defining a time range including the current time. In another further embodiment, the hierarchical tree is based on one or more access terms defining nodes, the access terms including a time range of the contract, a day of the week of the contract, and a date range of the contract.

In still another aspect, the present application is directed to a method of extending discounted pricing of an order to items added to the order after purchase of the order. The method includes receiving, by a device from a user, a selection of items from a plurality of different items selectable to include in an order. The method also includes receiving, by the device, a first request to complete the order comprising the selection of items. The method further includes determining, by the device, a first discounted sale price for the order based on pricing of each item in the order. The method also includes receiving, by the device after purchase of the order at the first discounted sale price, a second request to add an item from the plurality of different items to the order. The method further includes determining, by the device after purchase of the order, a second discounted sale price for the order based on pricing of the added item in combination with pricing of each item previously purchased.

In one embodiment, the method includes determining, by the device, the first discounted sale price for the order based on different business margins of each item. In another embodiment, the method includes determining, by the device, to offer the first discounted sale price for the order based on having a predetermined number of items in the order. In still another embodiment, the method includes receiving, by the device, after delivery of at least one item in the order, the second request to add the item to the order. In yet still another embodiment, the method includes determining, by the device, the second discounted sale price for the order based on a business margin of the added item and a business margin of each item.

In some embodiments, the method includes determining, by the device, to offer the second discounted sale price for the order based on a predetermined number of items in the order, including each item previously purchased. In other embodiments, the method includes adjusting, by the device, a price for the order based on a difference between the first discounted price and the second discounted price. In a further embodiment, the method includes billing, by the device, the user the difference between the first discounted price and the second discounted price.

In some embodiments, the method includes allowing, by the device, the user to add additional items to the order after purchase of the order until expiration of a predetermined time period. In other embodiments, the first discounted sale price is based on a predetermined retail price and predetermined net price for each item in the order and a predetermined business margin range.

In another aspect, the present invention is directed to a method of extending dynamic pricing of admissions added to an order. The method includes receiving, by a device from a user, a selection of admissions to attractions from a plurality of different attractions selectable to include in an order. The method also includes receiving, by the device, a first request to complete the order comprising the selection of attractions. The method further includes determining, by the device, a first discounted sale price for the order based on pricing of each attraction in the order. The method also includes receiving, by the device after purchase of the order at the first discounted sale price, a second request to add an admission to the order. The method further includes determining, by the device after purchase of the order, a second discounted sale price for the order based on dynamic pricing of the added admission in combination with each previous purchased admission in the order.

In some embodiments, the method includes determining, by the device, the first discounted sale price for the order based on different business margins of each admission. In other embodiments, the method includes determining, by the device, to offer the first discounted sale price for the order based on having a predetermined number of admissions to attractions in the order. In still other embodiments, the method includes receiving, by the device, after delivery of at least one admission ticket for the order, the second request to add an admission to the order. In yet still other embodiments, the method includes determining, by the device, the second discounted sale price for the order based on a business margin of the added admission and a business margin of each admission.

In one embodiment, the method includes determining, by the device, to offer the second discounted sale price for the order based on a predetermined number of admissions in the order, including each admission previously purchased. In another embodiment, the method includes adjusting, by the device, a price for the order based on a difference between the first discounted price and the second discounted price. In yet another embodiment, the method includes billing, by the device, the user the difference between the first discounted price and the second discounted price.

In some embodiments, the method includes allowing, by the device, the user to add additional admissions to the order after purchase of the order until expiration of a predetermined time period. In other embodiments, the first discounted sale price is based on a predetermined retail price and predetermined net price for each admission in the order and a predetermined business margin range.

In yet another aspect, the present application is directed to a system for extending discounted pricing of an order to items added to the order after purchase of the order. The system includes a device deployed as a server configured to receive, from a user, a selection of items from a plurality of different items selectable to include in an order. The server is also configured to receive a first request to complete the order comprising the selection of items. The server is further configured to determine a first discounted sale price for the order based on pricing of each item in the order. The server is also configured to receive, after purchase of the order at the first discounted sale price, a second request to add an item from the plurality of different items to the order. The server is also configured to determine, after purchase of the order, a second discounted sale price for the order based on pricing of the added item in combination with pricing of each item previously purchased.

In some embodiments, the server is further configured to determine the first discounted sale price for the order based on different business margins of each item. In other embodiments, the server is further configured to determine to offer the first discounted sale price for the order based on having a predetermined number of items in the order. In still other embodiments, the server is further configured to receive, after delivery of at least one item in the order, the second request to add the item to the order. In yet still other embodiments, the server is further configured to determine, by the server, the second discounted sale price for the order based on a business margin of the added item and a business margin of each item.

In one embodiment, the server is further configured to determine to offer the second discounted sale price for the order based on a predetermined number of items in the order, including each item previously purchased. In another embodiment, the server is further configured to adjust a price for the order based on a difference between the first discounted price and the second discounted price. In still another embodiment, the server is further configured to bill the user the difference between the first discounted price and the second discounted price.

In some embodiments, the server is further configured to allow the user to add additional items to the order after purchase of the order until expiration of a predetermined time period. In other embodiments, the first discounted sale price is based on a predetermined retail price and predetermined net price for each item in the order and a predetermined business margin range.

In yet another aspect, the present invention is directed to a method of offering a new attraction to add to an access ticket. The method includes providing, by a server to a user, an access ticket purchased by the user, the access ticket allowing access to one or more attractions selected by the user from a plurality of attractions. The method also includes determining, by the server, to offer to the user an opportunity to purchase access via the access ticket to one or more additional attractions not purchased. The method further includes transmitting, by the server to a device of the user, an offer to purchase access to the one or more additional attractions. The method also includes receiving, by the server responsive to transmitting the electronic offer, a selection by the user to add access to an attraction from the one or more additional attractions to the access ticket.

In some embodiments, the method includes transmitting, by the server to a second device of the user, the access ticket in electronic form. In other embodiments, the method includes providing, by the server to the device of the user, the access ticket comprising one of the following: a token, and a barcode. In other embodiments, the method includes determining, by the server, to offer to the user the opportunity to purchase access to the one or more additional attractions based on a location of the device of the user being in a predetermined proximity to an attraction of the one or more additional attractions. In still other embodiments, the method includes determining, by the server, to offer to the user the opportunity to purchase access to the one or more additional attractions based on a promotion initiated via the server by the one or more additional attractions.

In one embodiment, the method includes determining, by the server, to offer to the user the opportunity to purchase access to the one or more additional attractions based on detecting the user has accessed with the access ticket an attraction from the one or more purchased attractions. In another embodiment, the device comprises a mobile device. In still another embodiment, the method includes dynamically pricing, by the server, a price for the access ticket based on the added attraction. In some embodiments, the method includes dynamically pricing, by the server, a price for the access ticket based on the user's selection of the one or more attractions. In other embodiments, the method includes providing, by the server, a discount on a price of access to the added attraction based on the one or more attractions already purchased on the access ticket.

In yet still another aspect, the present application is directed to a system for offering a new attraction to add to an access ticket. The system includes a device of a user; and a device deployed as a server, in communication with the device of the user. The server is configured to provide, to the user, an access ticket purchased by the user, the access ticket allowing access to one or more attractions selected by the user from a plurality of attractions. The server is also configured to determine to offer to the user an opportunity to purchase access via the access ticket to one or more additional attractions not purchased. The server is further configured to transmit, to the device of the user, an offer to purchase access to the one or more additional attractions. The system is also configured to receive, responsive to transmitting the electronic offer, a selection by the user to add access to an attraction from the one or more additional attractions to the access ticket.

In one embodiment, the system further includes a second device of the user, and wherein the server is further configured to transmit, to the second device, the access ticket in electronic form. In another embodiment, the server is further configured to provide, to the device of the user, the access ticket comprising one of the following: a token, and a barcode. In still another embodiment, the server is further configured to determine to offer to the user the opportunity to purchase access to the one or more additional attractions based on a location of the first device of the user being in a predetermined proximity to an attraction of the one or more additional attractions.

In some embodiments, the server is further configured to determine to offer to the user the opportunity to purchase access to the one or more additional attractions based on a promotion initiated via the server by the one or more additional attractions. In other embodiments, the server is further configured to determine to offer to the user the opportunity to purchase access to the one or more additional attractions based on detecting the user has accessed with the access ticket an attraction from the one or more purchased attractions.

In one embodiment, the device of the user comprises a mobile device. In another embodiment, the server is further configured to dynamically generate a price for the access ticket based on the added attraction. In still another embodiment, the server is further configured to dynamically generate a price for the access ticket based on the user's selection of the one or more attractions. In yet still another embodiment, the server is further configured to provide a discount on a price of access to the added attraction based on the one or more attractions already purchased on the access ticket.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
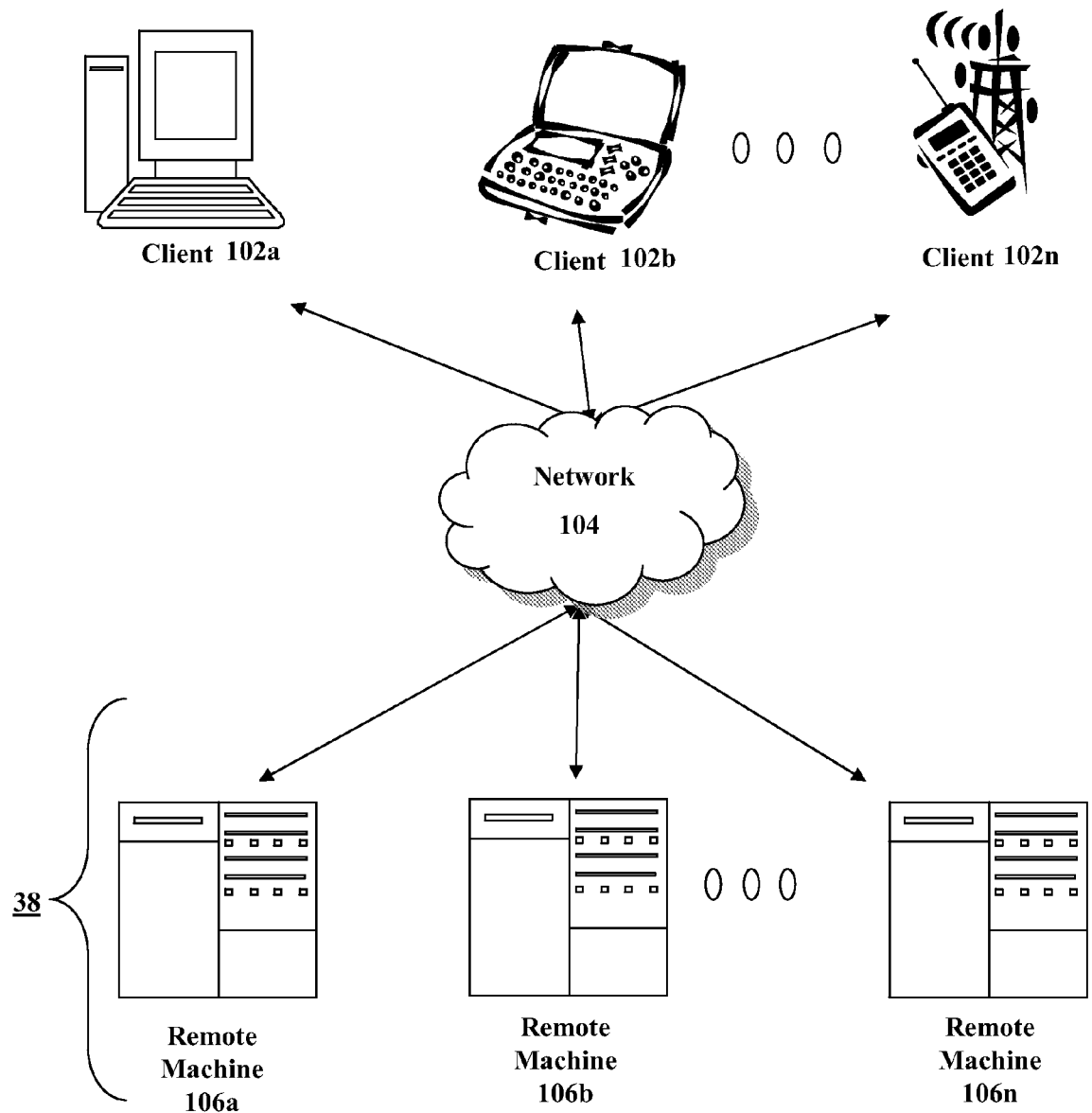
FIG. 1A is a block diagram depicting an embodiment of a network environment comprising local machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments below, the following descriptions of the sections of the specification and their respective contents may be helpful:

Section A describes a network environment and computing environment which may be useful for practicing embodiments described herein;

Section B describes systems and methods for dynamic pricing of items, goods, services, or tickets to attractions or events;

Section C describes systems and methods for selling and validating access tickets or tokens; and Section D describes systems and methods for dynamically pricing an extended order or offer for goods, services, events and other items.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment includes one or more clients 102a-102n (also generally referred to as local machine(s) 102, node(s) 102, client(s) 102, client node(s) 102, client machine(s) 102, client computer(s) 102, client device(s) 102, endpoint(s) 102, or endpoint node(s) 102) in communication with one or more remote machines 106a-106n (also generally referred to as server(s) 106 or remote machine(s) 106) via one or more networks 104. In some embodiments, a client 102 has the capacity to function as both a client node 102 seeking access to resources provided by a server and as a server providing access to hosted resources for other clients 102a-102n.

Although FIG. 1A shows a network 104 between the clients 102 and the remote machines 106, the clients 102 and the remote machines 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped remote machines 106. In one of these embodiments, the logical group of remote machines may be referred to as a server farm 38 or a machine farm 38. In another of these embodiments, the remote machines 106 may be geographically dispersed. In other embodiments, a server farm 38 may be administered as a single entity. In still other embodiments, the server farm 38 includes a plurality of server farms 38. The remote machines 106 within each server farm 38 can be heterogeneous—one or more of the remote machines 106 or machines 106 can operate according to one type of operating system platform (e.g., WINDOWS NT, manufactured by Microsoft Corp. of Redmond, Wash.), while one or more of the other remote machines 106 can operate on according to another type of operating system platform (e.g., Unix or Linux).

In one embodiment, remote machines 106 in the server farm 38 may be stored in high-density rack systems, along with associated storage systems, and located in an enterprise data center. In this embodiment, consolidating the remote machines 106 in this way may improve system manageability, data security, the physical security of the system, and system performance by locating remote machines 106 and high performance storage systems on localized high performance networks. Centralizing the remote machines 106 and storage systems and coupling them with advanced system management tools allows more efficient use of server resources.

The remote machines 106 of each server farm 38 do not need to be physically proximate to another remote machine 106 in the same server farm 38. Thus, the group of remote machines 106 logically grouped as a server farm 38 may be interconnected using a wide-area network (WAN) connection or a metropolitan-area network (MAN) connection. For example, a server farm 38 may include remote machines 106 physically located in different continents or different regions of a continent, country, state, city, campus, or room. Data transmission speeds between remote machines 106 in the server farm 38 can be increased if the remote machines 106 are connected using a local-area network (LAN) connection or some form of direct connection. Additionally, a heterogeneous server farm 38 may include one or more remote machines 106 operating according to a type of operating system, while one or more other remote machines 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif., the Xen hypervisor, an open source product whose development is overseen by Citrix Systems, Inc., the VirtualServer or virtual PC hypervisors provided by Microsoft, or others.

Remote machine 106 may be a file server, application server, web server, proxy server, appliance, network appliance, gateway, gateway server, virtualization server, deployment server, SSL VPN server, or firewall. In some embodiments, a remote machine 106 provides a remote authentication dial-in user service, and is referred to as a RADIUS server. In other embodiments, a remote machine 106 may have the capacity to function as either an application server or as a master application server. In still other embodiments, a remote machine 106 is a blade server. In yet other embodiments, a remote machine 106 executes a virtual machine providing, to a user or client computer 102, access to a computing environment.

A computing device 100 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on the computing device 100. In some embodiments, the application may be a server-based or a remote-based application executed on behalf of a user of a first computing device by a second computing device. In other embodiments, the second computing device may display output data to the first, client computing device using any thin-client or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

Figure 1B:
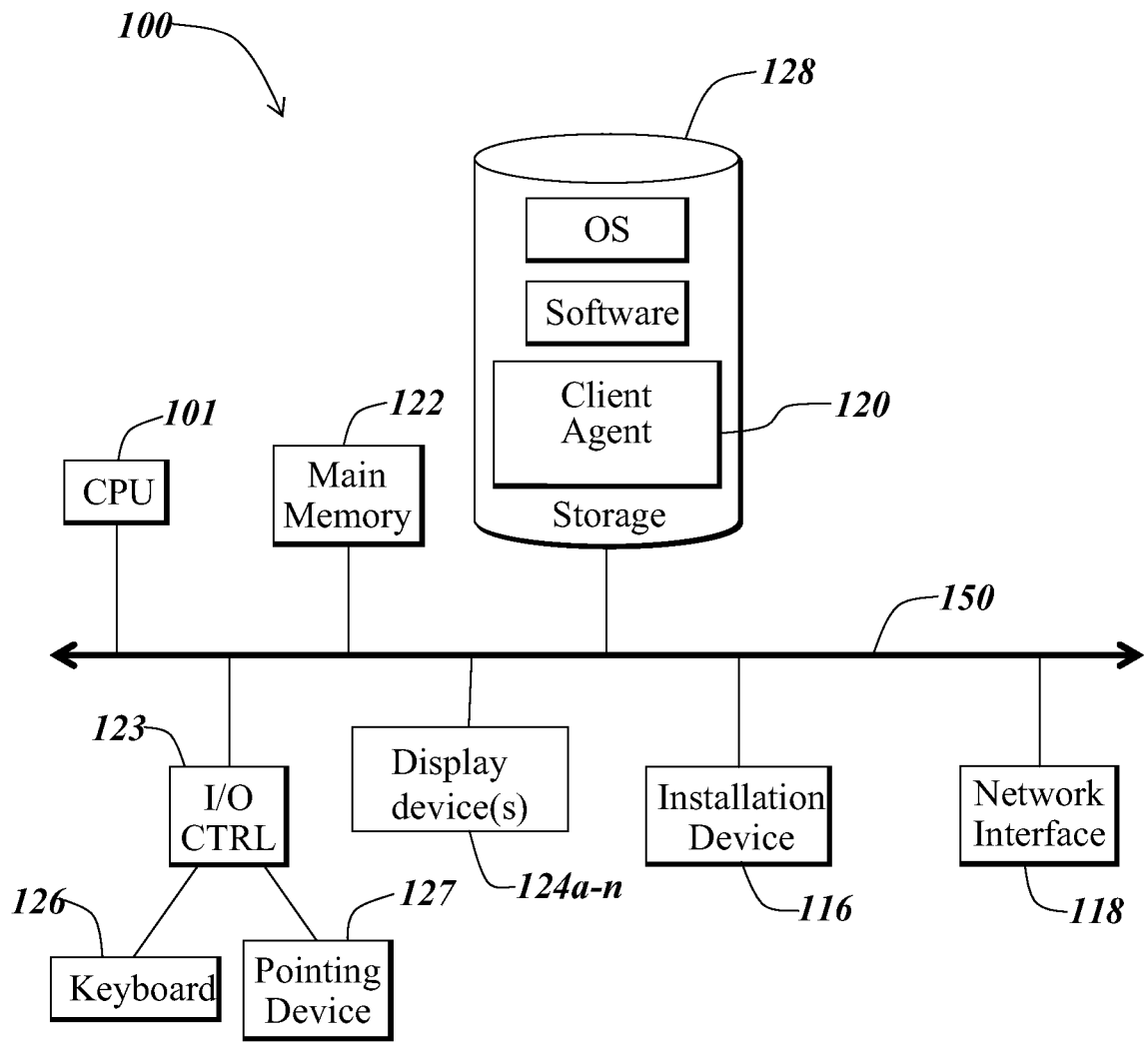
FIGS. 1B-1C are block diagrams depicting embodiments of computers useful in connection with the methods and systems described herein.
Figure 1C:
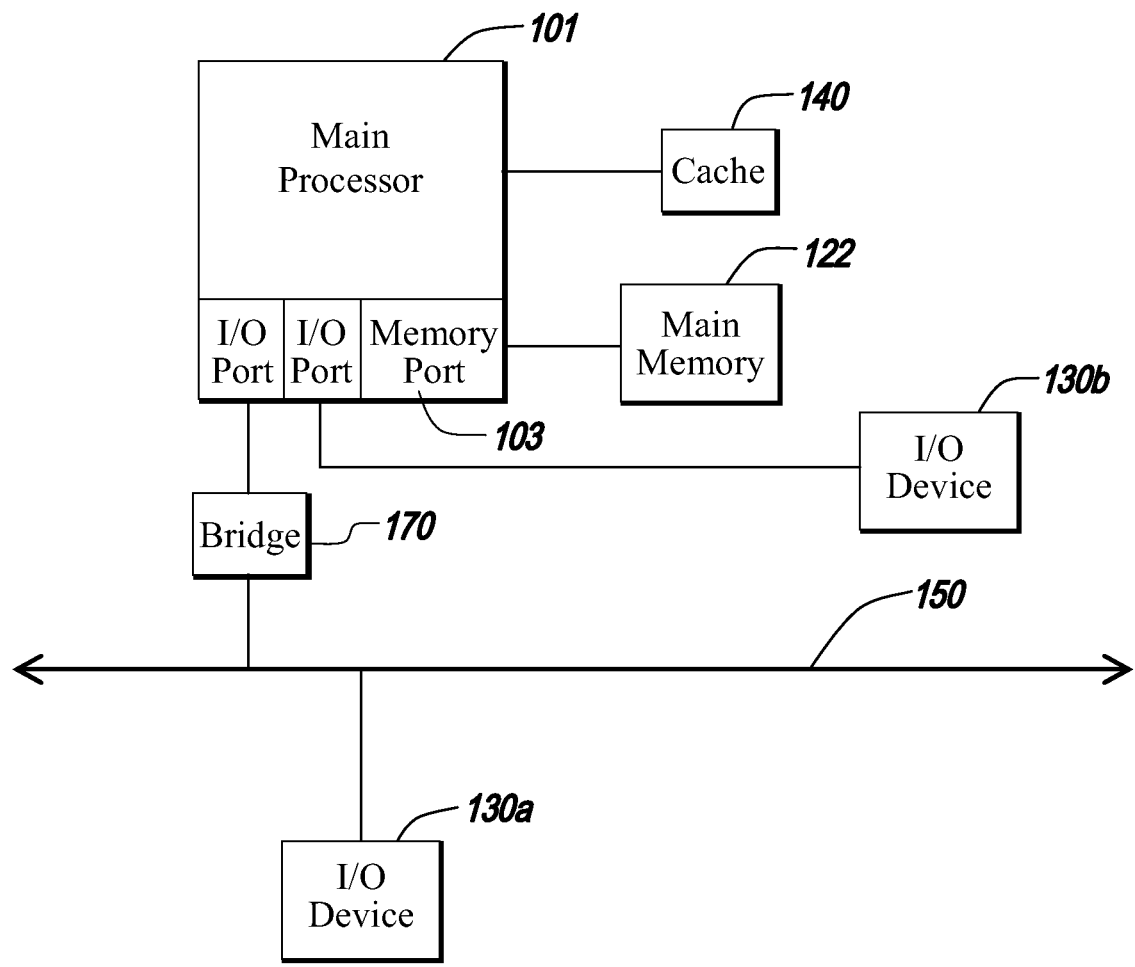

The client 102 and remote machine 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-124n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In some embodiments, the central processing unit 121 is provided by a microprocessor unit, such as:

those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output DRAM (EDO DRAM), Burst Extended Data Output DRAM (BEDO DRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with a display device 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc., of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, a flash memory drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS MOBILE, WINDOWS XP, and WINDOWS VISTA, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPOD, IPAD, or IPHONE families of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w/wx, 750, 755p, 800w, Centro, or Pro smart phone manufactured by Palm, Inc. In some of these embodiments, the TREO smart phone is operated under the control of the PalmOS operating system and includes a stylus input device as well as a five-way navigator device.

In other embodiments, the computing device 100 is a mobile device, such as a JAVA-enabled cellular telephone or personal digital assistant (PDA), such as the i55sr, i58sr, i85s, i88s, i90c, i95cl, i335, i365, i570, 1576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the ZEN VISION W, the ZEN VISION series, the ZEN PORTABLE MEDIA CENTER devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4MPEG-4 (H.264/MPEG-4 AVC) video file formats.

In some embodiments, the computing device 100 includes a combination of devices, such as a mobile phone combined with a digital audio player or portable media player. In one of these embodiments, the computing device 100 is a Smartphone, for example, an IPHONE manufactured by Apple Computer, or a Blackberry device, manufactured by Research In Motion Limited. In yet another embodiment, the computing device 100 is a laptop or desktop computer equipped with a web browser and a microphone and speaker system, such as a telephony headset. In these embodiments, the computing devices 100 are web-enabled and can receive and initiate phone calls. In other embodiments, the communications device 100 is a Motorola RAZR or Motorola ROKR line of combination digital audio players and mobile phones.

B. Systems and Methods for Dynamic Pricing of Goods, Services, or Tickets to Attractions or Events Before discussing specifics of an improved system for dynamically pricing goods, services, events, attractions, and other items, it may be helpful to provide definitions and examples of a few terms as used herein:

Inventory Items: inventory items, or just items, in some embodiments, may refer to goods, such as clothing, books, ebooks, software, household goods, toys, electronic equipment, coupons, gift certificates, or any other type and form of tangible or intangible goods; services or tokens or tickets for services, such as bus, train, or airline travel, hotel reservations, repair services, legal services, time utilizing or access to a cloud computing service or application, credits for online networks or multiplayer games, or any other type and form of service or access ticket or token for a service; tickets to attractions, such as museums, parks, tours, cruises, fairs, amusement or theme parks, lift tickets for ski resorts, beaches with paid admission, or any other type and form of attraction; or tickets to events, such as theater tickets, movie tickets, concert tickets, lectures, classes, or any other type and form of event. In some embodiments, an item may overlap multiple categories, such as a reservation for a restaurant wine tasting event, a combination tour and travel bus, or a combined lift ticket, ski rental, and lesson. The dynamic pricing and validation systems and methods discussed herein may be readily applied to items from any subcategory or combination of subcategories. Accordingly, these items may be referred to variously as items, inventory items, goods, services, attractions, or events, without limiting any embodiment to exclusively applying to a subcategory.

Destinations: a destination may refer to a geographic area that consumers may travel to. A destination may refer to a city, such as Boston or Toronto; a region, such as Wine Country, Calif., or the Loire Valley of France; a park or collection of parks, such as the theme parks and attractions of the Walt Disney World Resort in Orange County, Fla.; a resort, such as the Mount Snow ski area in Vermont; an island, such as Bermuda or St. Martin; or any other potential travel destination. In some embodiments, a destination may refer to a route, such as a multi-island trip via a cruise ship.

Attraction or Event Destination: in some embodiments, attractions or events may be grouped based on destination. For example, multiple theater shows and/or museums in a single city may be grouped. In other embodiments, an attraction may belong to multiple destinations.

Retail Price: a retail price may refer to a price that a consumer would pay if purchasing the item from the manufacturer, operator, or original provider directly. For example, a retail price of a good may refer to a manufacturer suggested retail price (MSRP). Similarly, a retail price of a ticket for an attraction or event may refer to a face value of the ticket, such as a concert ticket face value or admission ticket face value. In some embodiments, the retail price may be referred to as a default price. In one embodiment, the retail price may be zero.

In some embodiments in which the item is an admission ticket to an event or attraction, there may be multiple retail prices for the admission ticket, such as an adult admission retail price, a child admission retail price, a student admission retail price, a veteran admission retail price, a disabled admission retail price, or any other type of classification of the admission ticket. In similar embodiments, the admission may have different retail prices based on location of seat within a venue. In other embodiments, such as where the item is an airline travel ticket, the item may have different retail prices based on class, such as first class, business class, or economy class. In still other embodiments, such as where the item is an item of clothing, the item may have different retail prices based on size, such as a higher price for an extra-large size as opposed to a small size. However, in other embodiments, these different admissions, tickets, goods, or other items may be considered separate items. For example, in one embodiment, an adult admission ticket may be considered a separate item from a child admission ticket, and therefore each item may have just a single retail price.

In other embodiments, an item may not necessarily have a normal sale price of its own. For example, an item may be an upgrade or modification to a second item, such as a upgrade to an admission ticket to an amusement park or museum that lets the ticket holder skip lines, or a travel ticket upgrade from coach to first class. In many embodiments, the upgrades may not be sold independently, but only with the item that is being upgraded, or at least to the same purchaser at a later time. While these upgrade or item extensions may not have an independent sale price, in many embodiments, a retail price as defined herein may still be set by the vendor or dynamic pricing system operator for the purpose of dynamic pricing and/or validation. Accordingly, with respect to such embodiments, a retail price may refer to a predetermined price set by the vendor or dynamic pricing system operator, other than a net price due to the vendor, for the purpose of determining a sale price as discussed herein.

In some embodiments, an attraction may have retail prices that may change over time, such as a seasonal change based on differences in demand at different times of year. In a further embodiment, an attraction may have a non-date specific retail price. In one embodiment, this non-date specific retail price may represent a default price, with seasonal variations applied as discounts or increases to the default price.

Additionally, as discussed shortly below, in some embodiments, a retail price may refer to two separate prices. In embodiments using a minimal volume type, a first item may have a first retail price used when the number of items in an order is below said first item's minimal volume type value, and may have a second retail price used when the number of items in the order is equal to or greater than said first item's minimal volume type value. In one embodiment, the second retail price may comprise the first retail price, minus a target customer value discount. In many embodiments, the first retail price may be predetermined by a vendor when establishing a contract, discussed in more detail below. Accordingly, the predetermined retail price may therefore equal the first retail price, and be proportional to the second retail price. For clarity, except when the distinction is specifically important, both of these prices may be referred to as the retail price.

Net Price: a net price may refer to a price that the dynamic pricing system operator agrees to pay to an item provider, such as a venue, attraction partner, manufacturer, wholesaler, or other source of items in exchange for the item provider providing the item to a purchaser. In some embodiments, payment may be due when the order is fulfilled, while in other embodiments, payment may be due at a future date, such as within 30 days, 60 days, 90 days, or any other agreed payment schedule. In embodiments in which the item is a good, an order may be fulfilled by delivery of the item, while in embodiments in which the item is an admission ticket, the order may be fulfilled when the purchaser of the ticket or customer visits the attraction or attends the event. In other embodiments in which the item is a service or access to a service, such as a cloud computing service, the order may be fulfilled when the purchaser or consumer utilizes or accesses the service. In embodiments in which payment is made to the provider at a future time, the net price may be determined or fixed at the time the order is fulfilled. For example, in one embodiment, the net price may be based on the time of access to an attraction and may be undetermined when a consumer purchases the ticket. When the user uses the ticket to access the attraction, the net price due to the attraction operator may be determined based on that time, even if payment is not provided immediately.

The net price is frequently lower than the retail price for an item, although in some embodiments, they may be the same or the net price may be higher. For example, in one embodiment, a retail price for an admission ticket to a concert may be $100, while the net price to be paid to the concert operator may be $70. Accordingly, if the dynamic pricing system operator sells the admission ticket at a sale price of $80, the consumer may save $20 off the retail price while the dynamic pricing system operator makes $10 in profit (although this may be further reduced due to transaction charges, handling charges, taxes, or other similar reductions). In some embodiments, the net price may be referred to as a provider invoice price. In one embodiment, the net price may be zero.

In some embodiments in which the item is an admission ticket to an event or attraction, there may be multiple net prices for the admission ticket, such as an adult admission net price, a child admission net price, a student admission net price, a veteran admission net price, a disabled admission net price, or any other type of classification of the admission ticket. In similar embodiments, the admission may have different net prices based on location of seat within a venue. In other embodiments, such as where the item is an airline travel ticket, the item may have different net prices based on class, such as first class, business class, or economy class. In still other embodiments, such as where the item is an item of clothing, the item may have different net prices based on size, such as a higher price for an extra-large size as opposed to a small size. However, in other embodiments, these different admissions, tickets, goods, or other items may be considered separate items. For example, in one embodiment, an adult admission ticket may be considered a separate item from a child admission ticket, and therefore each item may have just a single net price.

In some embodiments, an attraction may have net prices that may change over time, such as a seasonal change based on differences in demand at different times of year. In a further embodiment, an attraction may have a non-date specific net price. In one embodiment, this non-date specific net price may represent a default price, with seasonal variations applied as discounts or increases to the default price. In many embodiments, variations in the net price correspond to variations in the retail price of the item.

Sale Price: a sale price may refer to a price charged to a consumer for an item, access ticket or token, admission ticket, inventory item, or other product or service. In many embodiments, the sale price may be determined dynamically by the dynamic pricing system. In some embodiments, the sale price may be referred to as a discounted price or a customer invoice price. In many embodiments, the sale price is less than or equal to the retail price. In one embodiment, the sale price may be zero.

In some embodiments in which the item is an admission ticket to an event or attraction, there may be multiple sale prices for the admission ticket, such as an adult admission sale price, a child admission sale price, a student admission sale price, a veteran admission sale price, a disabled admission sale price, or any other type of classification of the admission ticket. In similar embodiments, the admission may have different sale prices based on location of seat within a venue. In other embodiments, such as where the item is an airline travel ticket, the item may have different sale prices based on class, such as first class, business class, or economy class. In still other embodiments, such as where the item is an item of clothing, the item may have different sale prices based on size, such as a higher price for an extra-large size as opposed to a small size. However, in other embodiments, these different admissions, tickets, goods, or other items may be considered separate items. For example, in one embodiment, an adult admission ticket may be considered a separate item from a child admission ticket, and therefore each item may have just a single sale price.

In some embodiments, an attraction may have sale prices that may change over time, such as a seasonal change based on differences in demand at different times of year. In a further embodiment, an attraction may have a non-date specific sale price. In one embodiment, this non-date specific sale price may represent an adjusted or discounted non-date specific retail price. In many embodiments, variations in the sale price correspond to variations in the retail price or net price of the item.

In some embodiments, the sale price may be determined as a dollar amount (or amount in another currency), or as a percentage discount from the retail price. In one embodiment, if the sale price is a percentage value, the dynamic pricing system may determine a dollar amount or other currency amount responsive to the percentage value.

Minimal Volume Type: in some embodiments, a discount may be applied based on a number of items in an order. For example, in one such embodiment, if a consumer orders 2 items, they may receive a 5% discount; if they order 4 items, they may receive a 10% discount; etc. In some embodiments, if the order contains only a single item, no discount may applied, and the sale price may be dynamically set to the retail price of the item. In other embodiments, however, a provider of an item or venue operator may change this behavior, by setting a minimal volume type associated with the good, service, attraction, ticket, or other item. The minimal volume type may comprise a string, flag, or other indicator in a database or other record associated with the item, and may indicate a minimum number of items in the order before a discount may be applied. For example, if the minimal volume type is set to 1, then if the item is the only item in the order, the sale price may be set equal to the retail price or the item may be sold at the retail price. If the order contains more than the minimal volume type number, the sale price of the item may be dynamically determined, including discounts applied. This may be done to encourage consumers to purchase more items, or provide incentives for frequent purchasers. In some embodiments, the minimal volume type for an item may be set to 0. In such a case, even if the item is the only item in the order, the sale price of the item may be dynamically determined.

Customer discount: the customer discount may refer to a percentage discount or savings a consumer receives when purchasing one or more items at their respective sale prices or a combined sale price compared to purchasing the one or more items at their respective retail prices or a combined retail price. In many embodiments, the customer discount may be a default or target customer value, which may be set by the operator of the dynamic pricing system. For example, in one embodiment, the target customer value may be 105%, indicating that the retail price for an item is at least 105% of the dynamically determined sale price for the item. In some embodiments, static customer discounts may be applied to items individually by an operator of the dynamic pricing system. This may be done, for example, for sales or promotions, responsive to up-selling or cross-selling opportunities for consumers who purchase an item, or for other reasons.

Figure 2:
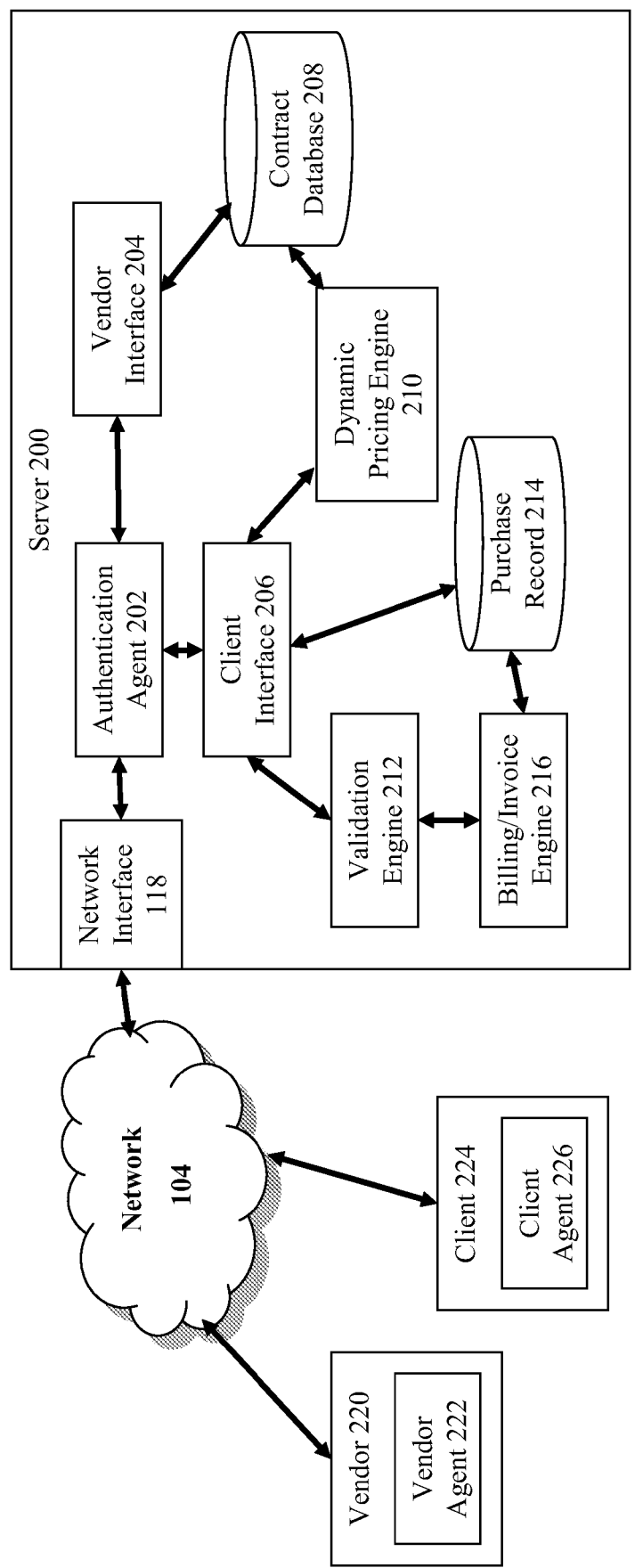
FIG. 2 is a block diagram depicting an embodiment of a system for dynamically pricing and validating access to goods, services, attractions, events and other items.

Referring now to FIG. 2, illustrated is a block diagram depicting an embodiment of a system for dynamically pricing and validating access to goods, services, attractions, events and other items. In brief overview, a server 200 may connect via a network 104 to one or more vendors 220 and/or clients 224. Although referred to as vendors 220 and clients 224, in many embodiments, vendors 220 and clients 224 may comprise computing devices used by vendors and clients, such as desktop computers, smartphones, laptop computers, terminals, or any other type and form of computing device. Similarly, server 200 may comprise any type and form of computing device. Although server 200 is illustrated as a single server, in some embodiments, server 200 may comprise multiple servers, such as a server farm, an application server and a database server, one or more web servers, or other collections of purpose-specific or general servers. In some embodiments, server 200 may comprise one or more servers or virtual servers executed by a cloud service. Although only a single network 104 is illustrated, in many embodiments, multiple networks 104 may be used to connect to one or more vendors 220 or clients 224. In some embodiments, server 200 may comprise a network interface 118 and an authentication agent 202, providing access to a vendor interface 204 and/or a client interface 206. Vendors and administrators may utilize the vendor interface 204 to add or configure contracts for selling items, stored in contract database 208. Server 200 may execute a dynamic pricing engine 210 to dynamically calculate sale prices, discounts, apply business margin verification rules, or perform other functions for allowing a client using client interface 206 to purchase an item. In some embodiments, server 200 may further comprise a validation engine 212, billing or invoice engine 216, and/or a purchase record database 214. In some embodiments, vendor 220 may include a vendor agent 222, and/or client 224 may include a client agent 226.

Still referring to FIG. 2 and in more detail, in some embodiments, a server 200 may comprise or execute an authentication agent 202. Authentication agent 202 may comprise an application, server, service, program, daemon, or other executable code for authenticating a user, client, administrator, or vendor. In some embodiments, authentication agent 202 may comprise a login service or other service to verify the identity and/or credentials of a user. In some embodiments, authentication agent 202 may direct a user to either client interface 206 or vendor interface 204, depending on whether the user is a customer, or a vendor or other provider of items.

Vendor interface 204 may comprise a web service, application, web page, or other interface for allowing a vendor to specify details of an item contract stored in contract database 208. An item contract may comprise an agreement to provide an item of inventory, provide goods or services, allow access to an event or attraction, or otherwise fulfill a customer order. An item contract may include one or more terms that may be configurable by the vendor via vendor interface 204, or an administrator.

Figure 3A:
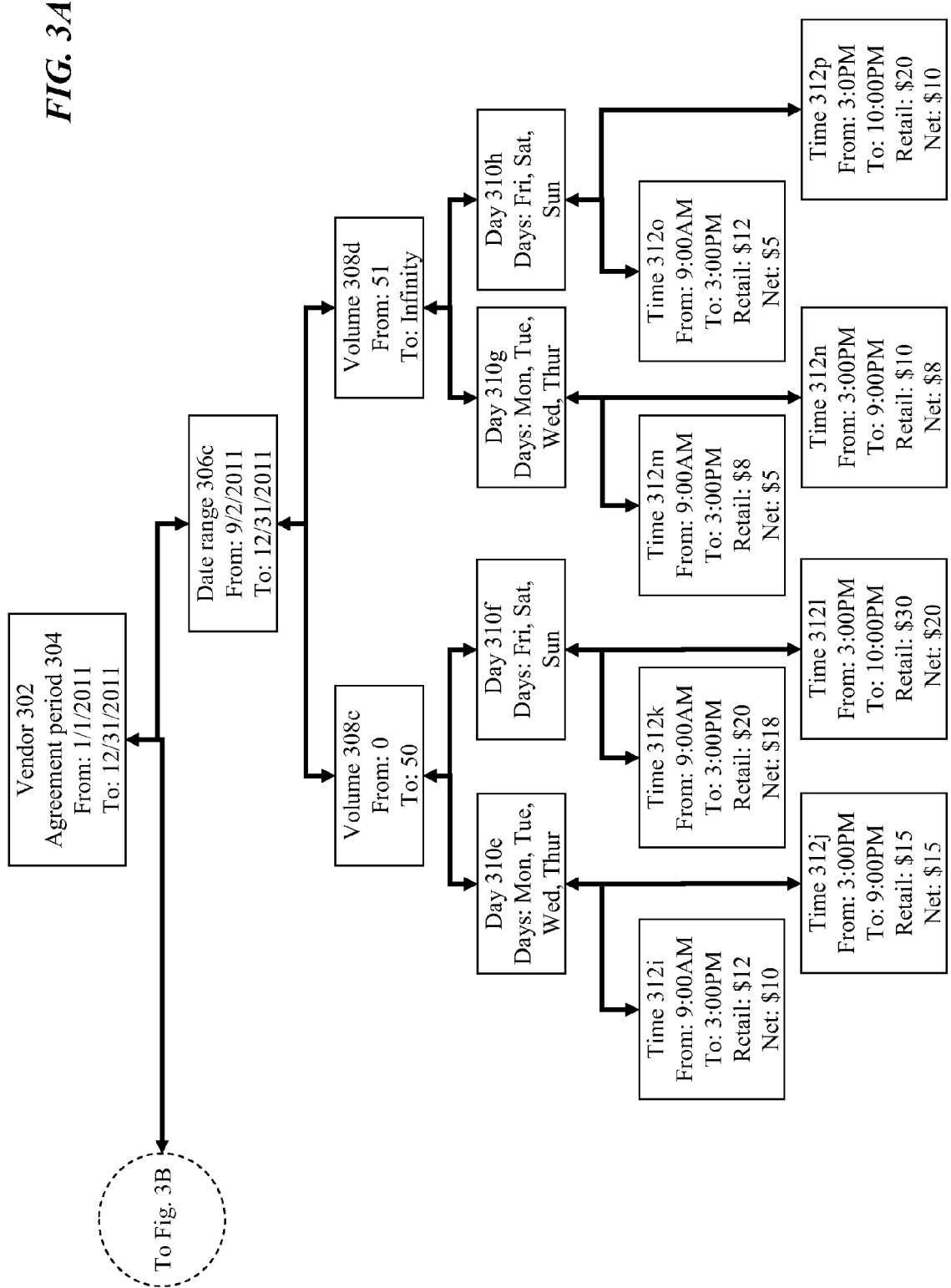
FIGS. 3A and 3B are a block diagram of an embodiment of a hierarchical tree for dynamically pricing goods, services, attractions, events and other items.
Figure 3B:
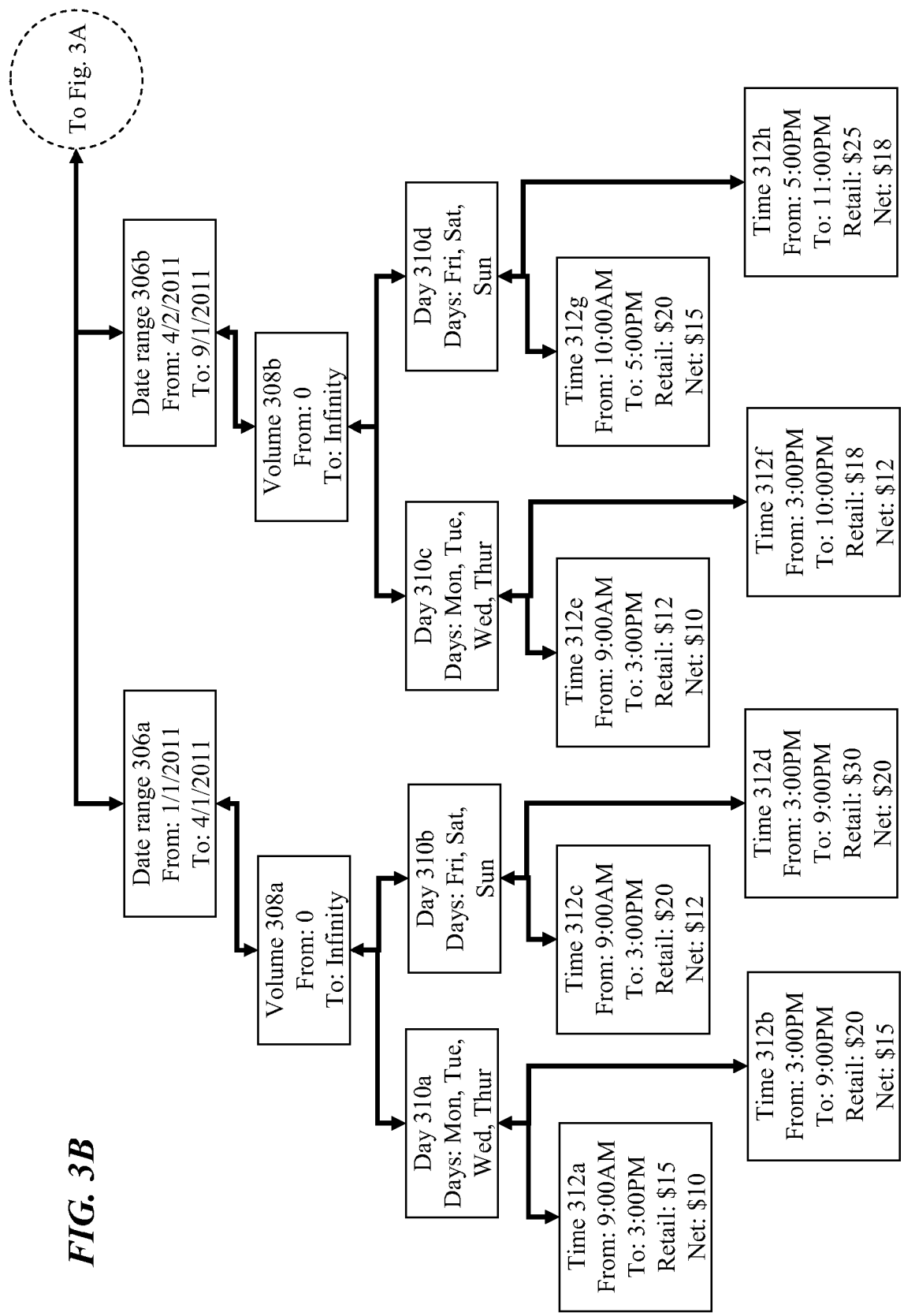

Referring briefly to FIGS. 3A and 3B, illustrated is a block diagram of an embodiment of a hierarchical tree for dynamically pricing goods, services, attractions, events or other items (divided between FIGS. 3A and 3B due to size). The hierarchical tree may represent a plurality of contracts provided by a vendor 302 that vary by term variables 304-312. Although the entire tree may be the result of a contractual agreement between the dynamic pricing service provider and the vendor or item provider, in this context, an item contract may refer to a single leaf of the tree, and variables 304-312 may comprise nodes of the tree. Term variables may include an agreement period 304, or date range that the contracts 312 are valid. In the example shown, for instance, the contracts are valid for the year 2011. Although shown as a single root node, in some embodiments, the agreement period 304 may have multiple sibling nodes representing different date ranges. Similarly, in some embodiments, each vendor 302 may include a single tree, each vendor 302 may include multiple trees, or multiple vendors 302 may be separate nodes on a larger multi-vendor tree. In some embodiments, a root node from a tree may comprise a destination, such as New York City, N.Y., with multiple vendors 302 that provide admissions to events or attractions at the destination as nodes of the tree. This allows for the possibility of grouping items from multiple vendors by destination.

In some embodiments, term variables may include one or more date ranges 306a-306c (referred to generally as date ranges 306). Date ranges 306 may be a subset of an agreement period 304 date range. In some embodiments, term variables may include one or more volume terms 308a-308d (referred to generally as volume terms 308); one or more days or day ranges 310-310h (referred to generally as days 310); and one or more time ranges 312a-312o (referred to generally as times 312). In some embodiments, other term variables may be included as nodes in the tree, including a minimum volume type term, a ticket class term (with data values such as first class, business class, economy class, orchestra, balcony, mezzanine, general admission, daytime, nighttime, or any other class), a size term (with data values such as small, medium, large, or any other value, or numeric values, such as those for shoes or dress sizes), an admission type term (with data values such as child, adult, student, veteran, disabled, or any other type), an access duration term (with data values such as one hour, two hours, one day, or any other value), colors of a good, or any other contract term and variable. Thus, the hierarchical tree may be used for goods, services, attractions, events, or any other item, by providing different contract variable terms for nodes.

In some embodiments, nodes may be added to the hierarchical tree at any time, including after purchase of an item by a consumer. For example, a user may purchase an item, specifying one or more contract variable terms. Subsequent to the purchase, the item vendor or dynamic pricing system operator may add an additional contract variable. For example, as part of a promotion for an amusement park, a vendor may provide a reduced price on days when the noon temperature is above 85 degrees Fahrenheit. Accordingly, the vendor may add an additional level to the hierarchical tree with node variables of temperature above 85 degrees Fahrenheit, and at or below 85 degrees Fahrenheit, with different predetermined net and retail prices for the leaves corresponding to these nodes. As discussed in more detail below in part C, these terms may be left unspecified by the user at time of purchase, and subsequently determined at time of access. Accordingly, terms may be added to a consumer's order subsequent to purchase and delivery of the order, providing further flexibility for vendors.

In many embodiments, each item contract leaf may include a retail price and a net price. As discussed above, in many embodiments, a retail price and a net price for each item contract leaf may be set by the vendor or item provider. As shown, each leaf may include different retail and net prices from other leaves. While the net price is shown as a dollar amount, in many embodiments, the net price may be indicated by a vendor-indicated percentage discount from the retail price. In such embodiments, the dynamic pricing engine may calculate a currency amount for the net price, responsive to the vendor-indicated percentage. In many embodiments, the net price may be opaque to consumers or purchasers.

Figure 3C:
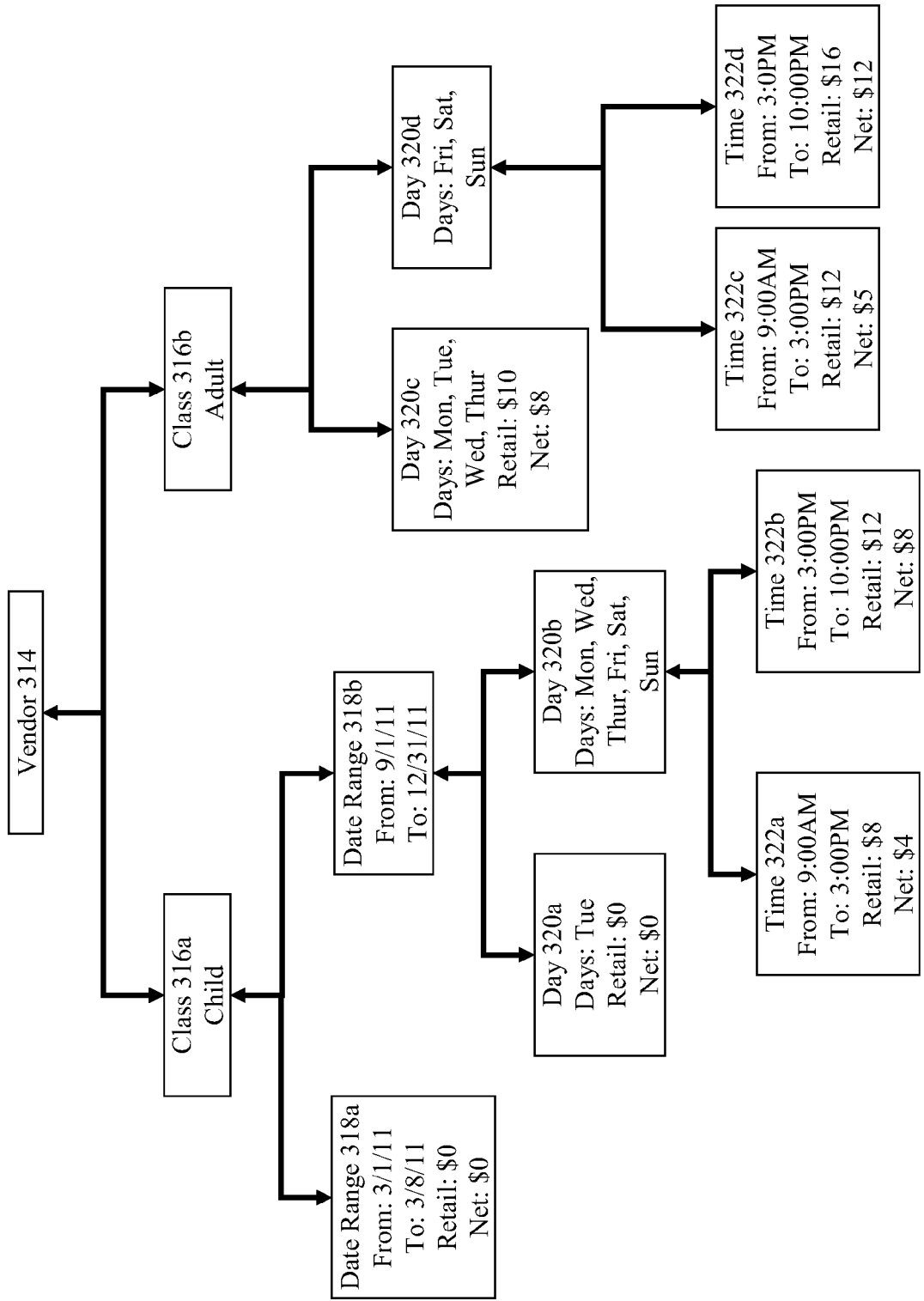
FIG. 3C is a block diagram of another embodiment of a hierarchical tree for dynamically pricing goods, services, attractions, events and other items.

Although the embodiment illustrated in FIGS. 3A and 3B has leaves at all at the same depth in the tree, in many embodiments, the tree may contain leaves at different levels. For example, referring to FIG. 3C, illustrated is a block diagram of another embodiment of a hierarchical tree for dynamically pricing goods, services, attractions, events or other items. In the example shown, leaves exist at three different levels in the tree. This may increase efficiency and flexibility, depending on contract terms and variables. For example, in the embodiment shown, a vendor 314 operating an attraction, such as a science museum, may have a deal where child admission tickets are free during a school vacation week 318a, free every Tuesday, and at variable prices depending on time during other days. Accordingly, when determining a dynamic price for a child's ticket or validating a child's ticket, the dynamic pricing engine may not need to perform additional levels of searching in the tree if the search terminates early. For example, the dynamic pricing engine may identify that the child's admission ticket is being used during the school vacation week and retrieve a retail and net price without needing to further determine a day or time or any other variable.

Although illustrated in a tree form in FIGS. 3A-3C, in many embodiments, the tree may comprise a directory, database, or a series of if-then statements. Accordingly, one skilled in the art should appreciate that the trees may be implemented in many forms without departing from the scope of the invention.

Referring back to FIG. 2, the vendor interface 204 may provide a vendor the ability to specify and define variable terms of the nodes of the hierarchical tree, as well as retail and net prices for each item contract leaf. The tree, or records representing the variables and contract leaf, may be stored in a database, data file, or other storage record in a contract database 208. Although shown on server 200, in many embodiments, contract database 208 may be stored on a database server or other storage device.

Still referring to FIG. 2, in some embodiments, a client interface 206 may comprise a web page, interface, application, or other executable code for allowing a client to search for, browse, and/or purchase items. In one embodiment, client interface 206 may comprise a shopping cart system or other interface for allowing a client to select one or more items to add to an order. In some embodiments, client interface 206 may indicate, dynamically as a user selects and deselects items to purchase, a dynamic sale price for the order. Client interface 206 may further indicate a total retail price for the order, as well as indicating a difference or savings between the total retail price and dynamic sale price. In some embodiments, the dynamic sale price may be updated substantially instantly as the user selects and deselects items to purchase, or updated within 250 ms, 100 ms, 50 ms or less. In other embodiments, the client interface 206 may not dynamically update the sale price, but instead update the sale price responsive to the user requesting an update of the price calculation.

A dynamic pricing engine 210 may comprise an application, server, service, daemon, routine, logic, or other executable code for calculating a sale price for one or more items from an order. In some embodiments, the dynamic pricing engine 210 may comprise functionality for applying one or more business margin validation rules to a calculated sale price. In one embodiment, the dynamic pricing engine 210 may comprise functionality for determining a volume discount for an order based on the number of items in the order.

In some embodiments, server 200 may comprise or communicate with a validation engine 212. Validation engine 212, sometimes referred to as a validation system or access validation system, may comprise an application, server, service, daemon, routine, logic, or other executable code for verifying an access token or ticket and/or providing an access token to a purchaser once the purchase has been validated. In some embodiments, an access token may comprise an indicator to an attraction or event that the purchaser has made a valid purchase and should be allowed entry. In other embodiments, an access token may comprise an access code, cookie, or other token usable by a client computing device of the purchaser to access a service, server, or web application.

In some embodiments, validation engine 212 may communicate with or maintain a purchase record database 214. Purchase record database 214 may comprise a database, data file, or other type or form of storage for recording purchase transactions. In one embodiment, a purchase record may indicate that a particular user has purchased a particular item. In another embodiment, a purchase record may indicate that a particular user has purchased an item without specifying one or more contract variables. This may be because the user has purchased an admission or access ticket without specifying a date or time, for example. In such cases, validation engine 212 may further comprise or access a counter, timer, or other service to determine a value (referred to variously as a value, a data value, a variable value, a node value, a term, an access term, or a characteristic) for the one or more contract variables. For example, if a user purchases an admission ticket to an attraction without specifying a date of access, when the user attempts to use the admission ticket, validation engine 212 may determine the date of the attempt use. In a further embodiment, validation engine 212 may search contract database 208 to identify if a valid contract leaf exists corresponding to the determined value for the one or more contract variables. If so, validation engine 212 may respond with an access token or other permission, and initiate payment to the vendor according to the net price indicated in the identified contract leaf.

In some embodiments, validation engine 212 may communicate with a billing or invoice engine 216. Billing or invoice engine 216, referred to generally as a billing engine 216, may comprise an application, server, service, logic, or other executable code for initiating payment to a vendor when an item is delivered to a purchaser or a purchaser uses an access ticket or requests a token or validation of a purchase. In some embodiments, billing engine 216 may also comprise functionality for receiving payment information from consumers to purchase an order of items.

In some embodiments, a vendor computing device 220 may execute a vendor agent 222, and/or a client computing device 224 may execute a client agent 226. Vendor agent 222 and client agent 226 may comprise web browsers, applications, web applets, smartphone applications, kiosk applications, or any other type and form of executable code for providing authentication credentials to authentication agent 202 and interacting with vendor interface 204 or client interface 206.

Figure 3D:
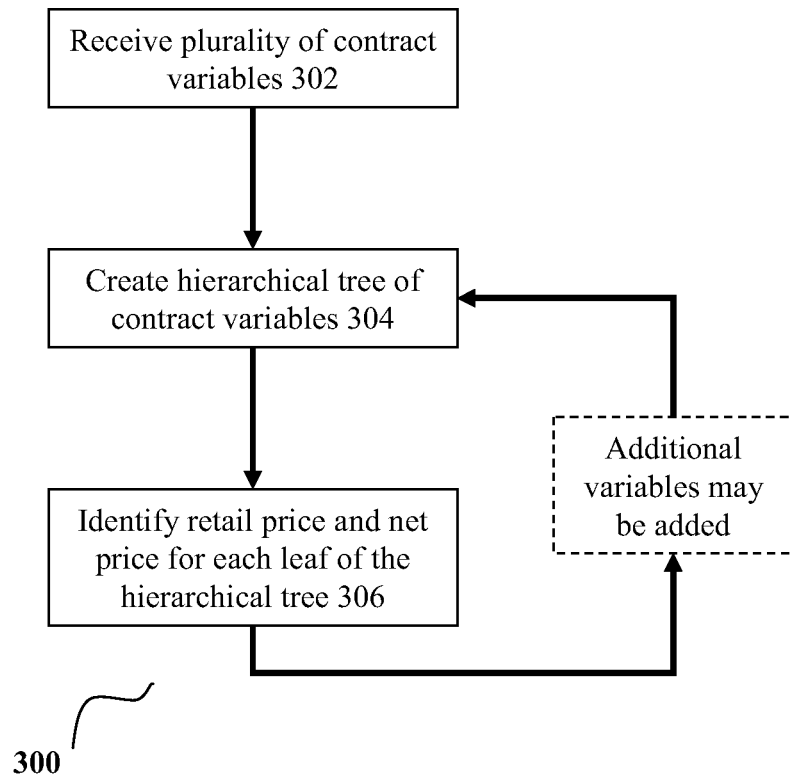
FIG. 3D is a flow chart of an embodiment of a method of dynamically pricing goods, services, attractions, and events through variable contract terms.

Referring now to FIG. 3D, illustrated is a flow chart of an embodiment of a method 300 of dynamically pricing goods, services, attractions, and events through variable contract terms. As discussed above in connection with FIGS. 3A and 3B, a hierarchical tree may be created with each variable contract term comprising a node, and each combination of a retail price and a net price comprising a leaf. In brief overview of method 300, in one embodiment, a server may receive a plurality of contract variables at step 302. In some embodiments, the server may receive one or more values for each of the plurality of contract variables. At step 304, the server may create a hierarchical tree of the received plurality of contract variables. In one embodiment, each node of the tree may correspond to one or more values for each of the plurality of contract variables. In some embodiments, the order of variables may be irrelevant, as the tree may include a leaf node for every possible combination of node variables. In other embodiments, there may be dependencies between nodes, reducing the overall number of leaf nodes. For example, if a first node level represents a range of dates that the contracts are valid including node values from January 1 to July 1, then a second node level representing months may not need to include values for August through December, because any contract leaf including these values would be invalid. However, in most embodiments in which values for each variable are manually entered, dependencies between nodes may be implicit and not need to be explicitly represented in the system (in the example above, the vendor may simply not include the months August through December as possible values).

At step 306, the server may receive a retail price and net price for each leaf of the hierarchical tree. In some embodiments, each leaf may be referred to as a contract, and the retail price and net price may correspond to each contract. In one embodiment, a vendor may input a retail price and net price for each contract using a vendor interface. In some embodiments, the server may receive a default retail price and default net price, and apply the default retail price and default net price to each leaf of the tree. The server may then receive modifications or adjustments to individual retail prices and net prices for each leaf, as desired by the vendor. In many embodiments of method 300, additional variables may be added, repeating steps 304 and 306.

Once a retail price and net price for each contract have been determined, it is possible to determine a business margin and apply one or more business margin rules. FIGS. 4A-4D are pricing diagrams of example embodiments of retail prices and net prices, illustrating determination of business margins. A business margin represents a level of profit for the dynamic pricing system provider, and may comprise a sale price for an item received from a purchaser minus a net price for the item to be paid to the item provider. In some embodiments, the business margin may be further reduced due to expenses, credit card fees, breakage, and/or acquisition costs. In other embodiments, the business margin may increased by a usage rate of the item below 100%. For example, in many embodiments in which the item is a coupon, gift certificate or gift card, reservation, or ticket, the dynamic pricing system provider may receive payment from the purchaser when the item is sold, but the purchaser may never use or redeem the item. In many embodiments, the item may have an expiration date, such as one year from time of purchase, and if the item is not used by then, the item expires. Over time, a usage rate of the item by all purchasers can be statistically determined, which will frequently be less than 100%. Because the dynamic pricing system operator may only have to pay providers the net price for the item when the item is used or redeemed, the entire sale price (or sale price minus expenses) of any unredeemed item may represent profit. Accordingly, the business margin of the item may be increased through a statistically predictable usage or lack of redemption rate.

Figures 4A, 4B:
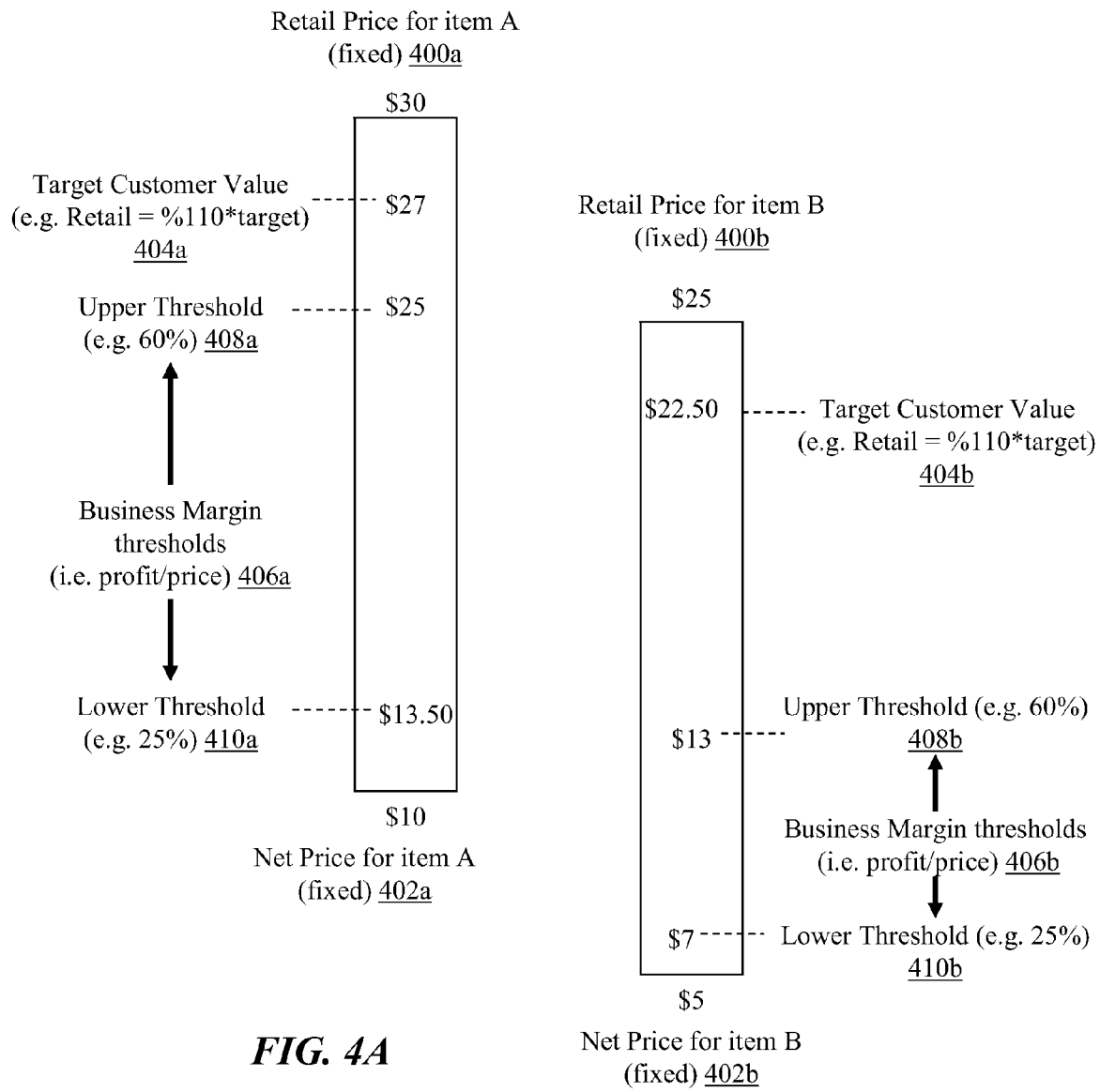
FIGS. 4A-4D are pricing diagrams of example embodiments of retail prices and net prices, illustrating determination of business margins.

Referring first to FIG. 4A, illustrated is a first example pricing diagram. In this example, the item may have a fixed retail price 400a of $30, and a fixed net price 402a of $10. If the item is sold at the retail price, the business margin 406a, calculated as profit/price may comprise $20, or 66% of the retail price (note that this simple example does not include the additional expenses, taxes, credit card fees, or acquisition costs). The system may also include a target customer value 404a of 110%. To provide the customer with this minimum customer value, the system may calculate an initial sale price of $27. If the item is priced at this level, the customer saves $3 and the system operator receives a profit of $17. While this satisfies the first business goal of the dynamic pricing system—providing the customer with a minimum target customer value—greater savings may be provided to the customer while satisfying a business margin requirement. For example, the system operator may determine that to remain profitable and experience enough growth, the system needs to provide business margins greater than a lower threshold 410a of 25%. However, the system operator may also determine that business margins greater than an upper threshold 410b of 60% may be unnecessary, and may be returned to the customer as increased savings. Accordingly, in the example shown, the sale price may be further reduced to $25, providing the customer with increased savings while still satisfying business margin requirements of the system operator.

In many embodiments, applying rules based on upper and lower thresholds for a business margin may result in greatly increased savings for the consumer. Referring now to FIG. 4B, illustrated is a second example pricing diagram. Here, due to the very low net price 402b compared to the retail price 400b, the target customer value 404b is almost $10 above the upper threshold 408b. The sale price may be reduced to the upper threshold, satisfying the business margin requirements while providing the customer an almost 50% discount.

Figure 4C:
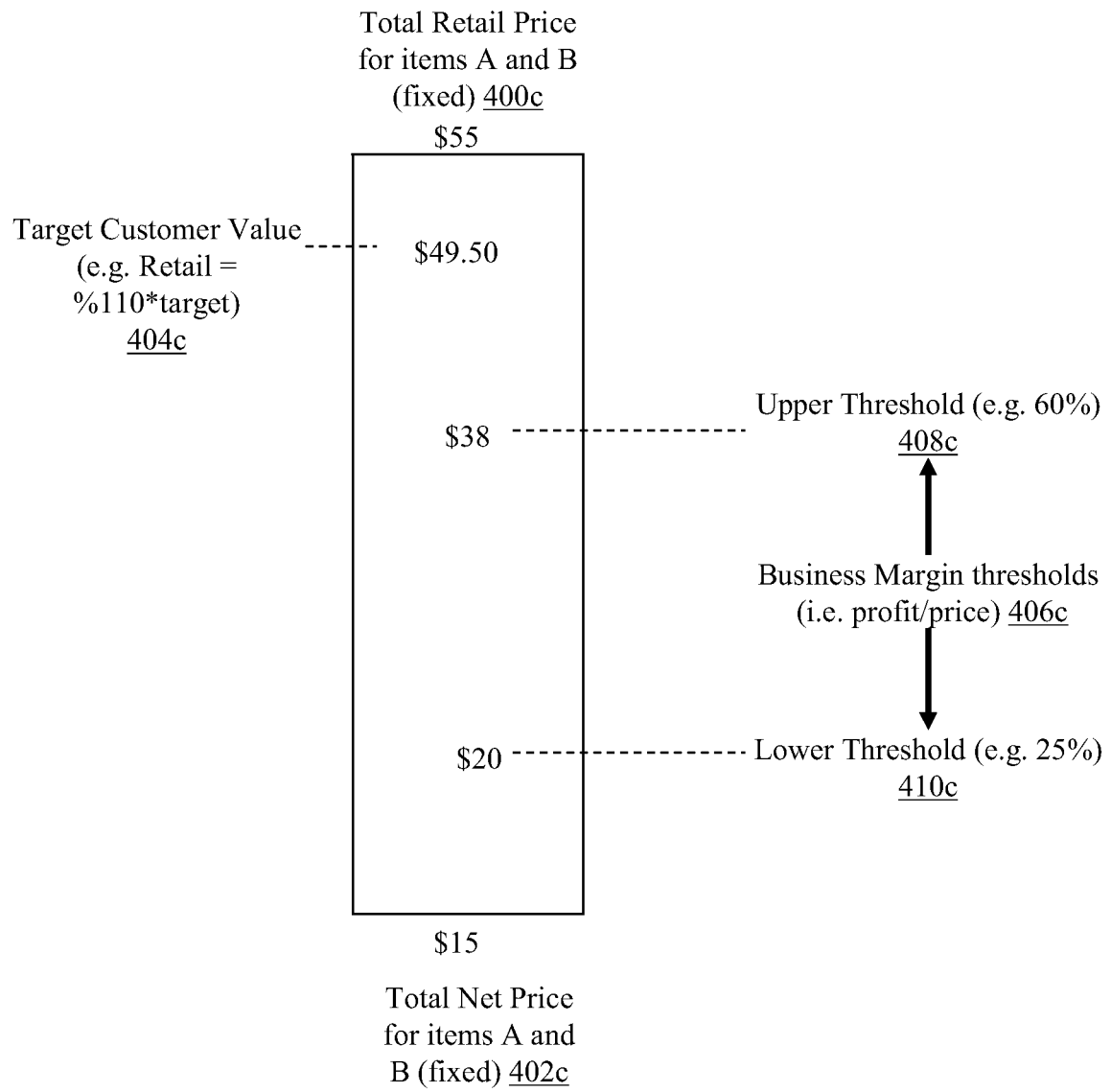

Referring briefly to FIG. 4C, illustrated is an example combined pricing diagram for the examples illustrated in FIGS. 4A and 4B. Because net prices and retail prices are independently fixed for each item, when multiple items are combined in an order, the overall business margin may not correspond to a business margin for each item if they were sold separately. Thus, a very high business margin may be offset by a much smaller or negligible business margin. By calculating a business margin based on the sum retail prices and sum net prices for all items in an order, a discounted sale price for the order may be determined even where one particular item in the order may be sold at or shortly above its net price. This may be more efficient than attempting to apply business margin thresholds to each item individually, and due to the offset between items, may result in greater discounts for consumers than if a discounted sale price were calculated for each item individually and the result totaled.

Figure 4D:
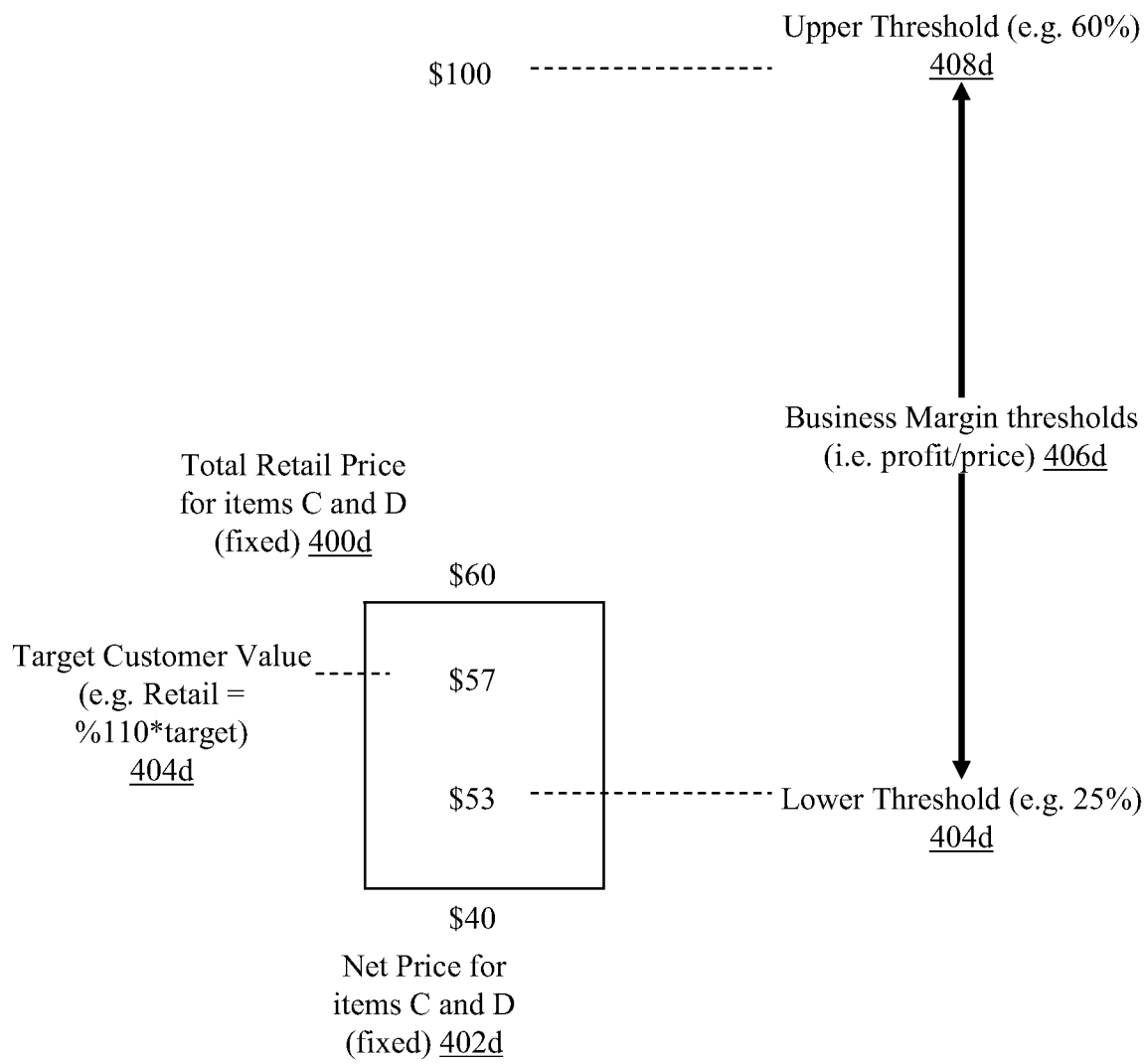

Referring to FIG. 4D, illustrated is an example pricing diagram in which the target customer value 404d lies within the upper and lower business margin thresholds 406d. This may be more typical of real world values, in which a vendor's net price is closer to the retail price for the item. In such cases, if the item is sold at the retail price, the business margin lies within the thresholds, but the customer has not received any discount. Accordingly, in many embodiments, the sale price may be verified against the target customer value 404d to ensure that the customer has received at least the target customer value. In the example shown, the item could be sold at $57, allowing the customer to save 10% off the retail price, while still satisfying the lower threshold of the business margin range.

In a further example not illustrated, the target customer value may lie below the lower the threshold of the range. This may happen, for example, when the net price is very close to the retail price. In one such embodiment, the customer may still be provided with a sale price at the target customer value, even though this results in a business margin below the lower threshold, or a nonexistent business margin. Because consumers are frequently unaware of the business margin, it may be more important to provide consumers with a discount to ensure their satisfaction with the system. Taking a loss on one item may be offset with profits on other items.

Accordingly, dynamic pricing may ensure that the sale price paid by a consumer satisfies minimal revenue margins of the dynamic pricing system operator, includes all available discounts, and always delivers at least the minimal customer discount (overriding any margin conditions). The lower business margin threshold may reflect the minimum revenue margin the dynamic pricing system operator would like to maintain at the time of sale, and may be set globally or per destination, per attraction, per vendor, or via other basis. Similarly, the upper business margin threshold may ensure that the dynamic pricing system operator may pass on additional discounts or savings to the customer. The upper business margin threshold may also be set globally, or per destination, per attraction, per vendor, or on another basis. In some embodiments, the business margin may be calculated as a percentage equal to 100*(total sale price of all items in the order−total net price of all items in the order)/(total net price of all items in the order). In many embodiments, the customer discount, used to verify that the minimum target customer value is achieved, may be calculated as a percentage equal to 100*(total retail price of all items in the order−total sale price of all items in the order)/(total retail price of all items in the order). In one embodiment, an initial sale price of each item, prior to verification against the business margins, may be calculated as equal to the retail price for each item divided by the target customer value.

Figure 4E:
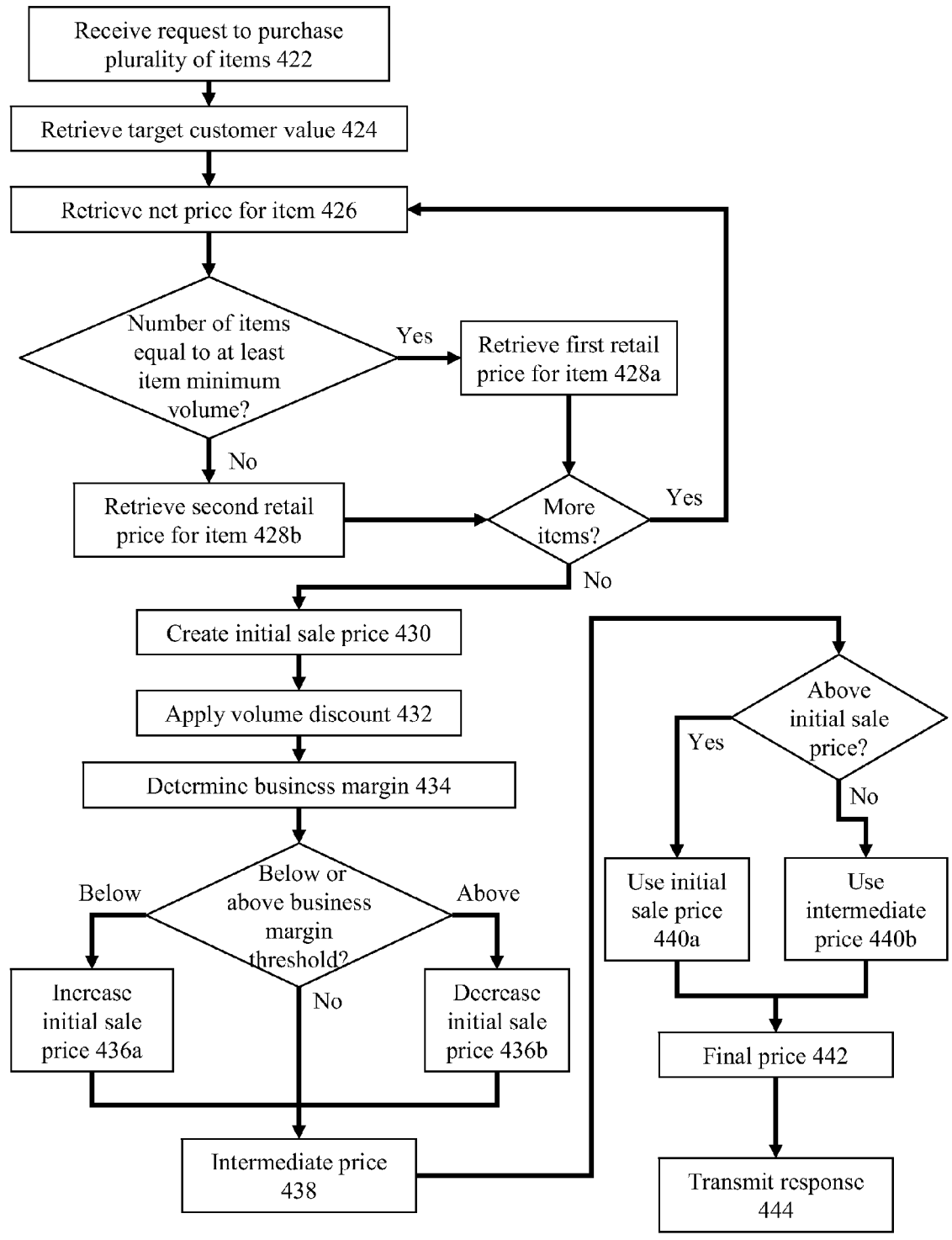
FIG. 4E is a flow chart of an embodiment of a method of balancing a business margin against a target customer value to fulfill a request to purchase one or more items.

Referring now to FIG. 4E, illustrated is a flow chart of an embodiment of a method 420 of balancing a business margin against a target customer value to fulfill a request to purchase one or more items. As discussed above, the one or more items may refer to goods, services, access tickets, admission tickets, tokens, coupons, gift certificates, or any other inventory item, or any combination of these items. In brief overview, at step 422, a computing device performing dynamic pricing may receive a request from a user to purchase a plurality of items. In some embodiments, each item may have a retail price and a predetermined net price. As discussed above, in some embodiments, a vendor of an item may set a minimum volume amount. In embodiments using a minimal volume type, each item may have a first retail price used when the number of items in an order is below said item's minimal volume type value, and may have a second retail price used when the number of items in the order is equal to or greater than said item's minimal volume type value. In one embodiment, the second retail price may comprise the first retail price, minus a target customer value discount.

At step 424, a dynamic pricing engine executed by the computing device may retrieve a target customer value. At step 426, the dynamic pricing engine may retrieve a net price for the first item of the plurality of items. In some embodiments using a minimal volume type, if the number of items exceeds or equals the first item's minimum volume value, then at step 428a, the dynamic pricing engine may retrieve a first retail price for the item. This may comprise a predetermined retail price set by the vendor, discounted by the target customer value. In some embodiments, this may be referred to as an initial sale price for an item, a discounted retail price, or a retail price. If the number of items is below the first item's minimum volume value, then at step 428b, the dynamic pricing engine may retrieve a second retail price for the item. In some embodiments, this may be referred to as an undiscounted retail price, a predetermined retail price, or a maximum retail price. This may comprise the predetermined retail price set by the vendor. Steps 426-428b may be repeated iteratively for each item of the plurality of items.

At step 430, the dynamic pricing engine may create an initial sale price. The initial sale price may comprise a sum of the retrieved discounted retail prices or undiscounted retail prices retrieved at steps 428a-428b for each item. In some embodiments, the initial sale price may thus comprise a sum of the retail prices for the plurality of items, discounted by a predetermined target customer value. At step 432, in some embodiments, a volume discount may be applied to the initial sale price.

At step 434, in some embodiments, the dynamic pricing engine may determine a business margin. The business margin may be based off the initial sale price, with or without the volume discount (still referred to generally as the initial sale price), and a sum of the net prices for each item. If the business margin is below a lower business margin threshold, then at step 436a, the initial sale price may be increased such that the business margin is equal to or greater than the lower business margin threshold. If the business margin is above an upper business margin threshold, then at step 436b, the initial sale price may be decreased such that the business margin is equal to or less than the upper business margin threshold. In either case, the adjusted result may comprise the intermediate price at step 438. Conversely, if the business margin is equal to one of or lies between the upper and lower business margin thresholds, then the initial sale price or volume-discount-adjusted initial sale price comprises the intermediate price at step 438.

If the intermediate price is above the initial sale price, then at step 440a, the initial sale price may be used as the final price 442. If the intermediate price is equal to or below the initial sale price, then at step 440b, the intermediate price may be used as the final price 442. This may be done in some embodiments to ensure that the customer receives at least a minimum target value. At step 444, in some embodiments, the system may transmit a response to the request to purchase the plurality of items.

Still referring to FIG. 4E and in more detail, at step 422, a computing device performing dynamic pricing may receive a request from a user to purchase one or more items. The request may comprise an API request, data request, a submitted query form such as an HTML GET or POST request, or any other type and form of request. In some embodiments, the request may be received via a network communication from a computing device used by the user, such as a desktop computer, laptop computer, tablet computer, smartphone, or other device. In some such embodiments, the request may be made through a web application or form, while in other such embodiments, the request may be made through a dedicated application. For example, the user may install an item ordering application on a mobile computing device to allow ease of making purchases, reserving tickets, or performing other similar functions. In other embodiments, the request may be received via entry at a kiosk. In still other embodiments, a third party, such as a ticket agent or customer service agent, may generate the request on behalf of the user. For example, the user may direct the third party via a telephone, oral, or written communication that they wish to purchase one or more items, and the third party may generate the request that is received by the computing device performing dynamic pricing.

The request may include one or more characteristics or terms for each of the one or more items, such as a size or color or shipping terms for a good, an access time or date for an admission ticket, a class of admission ticket such as child, adult, balcony, orchestra, or other class, or any other type and form of characteristic or term. In many embodiments, the request may not specify one or more terms or characteristics. In a further embodiment, the one or more terms or characteristics not specified may be required to fulfill the order or utilize the ticket or coupon or other item. For example, a date of entry for an attraction may be unspecified in the request, even though a date of entry is necessarily established when the user enters the attraction. In another example, the request may not specify whether a user will pick up a purchased good at a store location or have the good shipped to the user. This allows the user to make such determinations at a later date, allowing flexibility in schedules.

At step 424, a dynamic pricing engine executed by the computing device may retrieve a target customer value. The target customer value may represent a percentage or amount of currency saved by the customer when purchasing at a discounted price as opposed to a full retail price. For example, if an item normally sells for $20, and the customer purchases the item at a discounted price of $19, the customer has saved 5% of the retail price. In some embodiments, the target customer value may represent an amount saved, such as the 5% in the example, while in other embodiments, the target customer value may represent a retail price divided by a sale price. In such an embodiment of the previous example, the target customer value would be $20/$19 or 105%. In some embodiments, the target customer value may represent a threshold of a minimum guaranteed discount. For example, the target customer value may be used to ensure that a customer always receives at least a 5% discount off the retail price or prices of purchased items. While the example described above uses a 5% discount or 105% vs. retail value, other values may be used, such as 10%, 15%, 20%, or any other value.

In many embodiments, the target customer value may be a predetermined value set by the operator of the dynamic pricing system. In a further embodiment, the target customer value may be a universal value, applied to all items. In other embodiments, the target customer value may be a value set by a vendor of at least one item of the one or more items in the request. In a further embodiment, the target customer value may be a vendor-specific value applied to all items provided by that vendor. In other embodiments, the target customer value may be destination-specific, item-specific, or even customer-specific. For example, in one such embodiment, a first target customer value such as 110% may be applied to new customers or first-time users, while a second target customer value such as 105% may be applied to returning customers. This may be done to encourage first-time users to try the system.

At step 426, the dynamic pricing engine may retrieve a net price for the first item of the plurality of items. In some embodiments, each item may have a predetermined net price. Such predetermined net price may be set by a vendor of the item. The net price may comprise a price to be paid to the vendor when the item is purchased, and may be specified in an agreement between the vendor and the dynamic pricing system operator. In some embodiments, the net price may be paid immediately upon purchase, while in other embodiments, the net price may be paid at some point in the future, such as a monthly accounting, 30 day term, or other term.

In many embodiments, the predetermined net price may specific to one or more terms or characteristics of the item in the request. For example, the predetermined net price may be a first value for a large t-shirt and a second value for a small t-shirt, or may be a first value for a day lift ticket and a second value for an evening lift ticket, or may be a first value for an orchestra seat and a second value for a balcony seat. As shown in the hierarchical tree diagrams illustrated in FIGS. 3A-3C, the net price may be based on one or more variables of the request and may be retrieved by searching the tree for a leaf corresponding to the variables in the request.

As discussed above, in many embodiments, one or more terms or node variables for an item may not be included in the request. In such embodiments, retrieving a net price may comprise searching a hierarchical tree for one or more leaves corresponding to variables that are included in the request. For example, if a request specifies an adult admission, but does not specify a day of the week, multiple leaves corresponding to adult admissions for each day of the week may be found. When multiple corresponding leaves are found, in one embodiment, the dynamic pricing engine may retrieve the highest net price identified in the multiple corresponding leaves. For example, referring briefly back to the hierarchical tree illustrated in FIG. 3C, if the user specified in the request that the item was a child ticket, but did not specify a date range, day, or time, the dynamic pricing engine may identify the highest net price of $8 among the four leaves corresponding to child tickets. If instead the user specified that the ticket was an adult ticket, to be used on a Saturday, the dynamic pricing engine may identify the highest net price of $12 from the two leaves corresponding to adult tickets used on a Saturday. This may be done so that the net price used for calculating sale prices and business margins is a "worst-case" net price, or maximum amount to be paid to the vendor regardless of the value of the unspecified variable. In other embodiments, the dynamic pricing engine may retrieve the lowest net price identified. In still other embodiments, the dynamic pricing engine may retrieve an average net price calculated as an average of the net prices identified in the multiple corresponding leaves. In a further embodiment, the average net price may be calculated as a weighted average based on the number of leaves including the value, or based on the variable range for each leaf. For example, in one such embodiment using the above example, a weighted average net price may be calculated by a sum of each net price multiplied by the number of days the net price applies to, divided by the total number of applicable days. In other embodiments, average net prices may be weighted by a statistical probability of each variable being applied to an order. For example, if admissions tickets to a particular attraction are historically used 60% of the time on Friday, 20% on Saturday, and the remaining 20% across the remainder of the week, these percentages may be used in calculating an average net price. In a further embodiment, such percentages may be dynamically updated by the dynamic pricing engine as each order is validated, fulfilled, used, or accessed.

As discussed above, in some embodiments, a vendor of an item may set a minimum volume amount. In embodiments using a minimal volume type, each item may have a first retail price used when the number of items in an order is equal to or above said item's minimal volume type value, and may have a second retail price used when the number of items in the order is below said item's minimal volume type value. In one embodiment, the first retail price may comprise the second retail price, minus a target customer value discount. Accordingly, in such embodiments, the second retail price may be considered a predetermined retail price and the first retail price may be considered a calculated or adjusted retail price.

In some embodiments using a minimal volume type, if the number of items exceeds or equals the first item's minimum volume value, then at step 428a, the dynamic pricing engine may retrieve a first retail price for the item. This may comprise a predetermined retail price set by the vendor, discounted by the target customer value discussed above. In some embodiments, the first retail price may be referred to as an initial sale price for an item, a discounted retail price, or a retail price. If the number of items is below the first item's minimum volume value, then at step 428b, the dynamic pricing engine may retrieve a second retail price for the item. In some embodiments, this may be referred to as an undiscounted retail price, a predetermined retail price, or a maximum retail price. This may comprise the predetermined retail price set by the vendor.

In some embodiments, steps 428a-428b may be performed to allow a dynamic pricing system operator to apply volume discounts to purchases, while still charging a full retail price for a consumer who purchases only a single item. This may be done to prevent undercutting direct sales from a single vendor. For example, the dynamic pricing operator may sell admissions tickets to a science museum and computer museum that are not operated by the same vendor. To prevent undercutting individual sales of tickets at each museum, the dynamic pricing operator may charge full price for a single admission ticket, while discounting a combined admission ticket to both museums. This may be desirable for attracting vendors to provide inventory to the dynamic pricing system, for whom a reduced net price represents lost profit.

For example, to encourage purchases of multiple items, the operator may apply a 0% volume discount to purchases of a single item, a 5% volume discount to purchases of 2 or 3 items, a 10% volume discount to purchases of 4 items, etc. The sale price for the purchases including a plurality of items may be dynamically calculated and balanced against a business margin, while the sale price for the purchases of a single item may be set equal to the predetermined or non-discounted retail price. Steps 426-428b may be repeated iteratively for each item of the plurality of items.

At step 430, the dynamic pricing engine may create an initial sale price. The initial sale price may comprise a sum of the retrieved discounted retail prices or undiscounted retail prices retrieved at steps 428a-428b for each item. In some embodiments, the initial sale price may thus comprise a sum of the retail prices for the plurality of items, discounted by a predetermined target customer value. In one embodiment, the dynamic pricing engine may discount each retail price individually by the target customer value. In another embodiment, the dynamic pricing engine may sum each retail price and then reduce the sum of the retail prices by the target customer value. In one such embodiment, steps 428a-430 may be combined into a single step by calculating a sum of the predetermined retail prices of each item, and if the total number of items is less than the minimum volume value of each item, then the initial sale price may be equal to the predetermined retail price. Conversely, if the total number of items is equal to or greater than the minimum volume value of each item, then sum of the predetermined retail prices may be discounted by the target customer value to create the initial sale price.

At step 432, in some embodiments, a volume discount may be applied to the initial sale price. In one embodiment, a volume discount may be applied based on the number of items in the request. For example, if there are 2 items in the request, a discount of 5% may be applied to the initial sale price, while if there are 5 items in the request, a discount of 10% may be applied to the initial sale price. Different numbers of items and values of discounts may be used. In some embodiments, the number of items and corresponding discounts may comprise one or more policies applied by the dynamic pricing engine, and set by the operator of the dynamic pricing system. In many embodiments, the number of items and corresponding discounts may be vendor-specific, destination-specific, attraction-specific, item-specific, or user-specific.

At step 434, in some embodiments, the dynamic pricing engine may determine a business margin. The business margin may be based off the initial sale price, with or without the volume discount (still referred to generally as the initial sale price), and a sum of the net prices for each item. As discussed above in connection with FIGS. 4A-4D, the business margin may comprise a profit value divided by a price value, or an initial sale price (or sum of the retail or discounted retail prices for each of the one or more items in the order) minus a sum of the net prices for each of the one or more items in the order, divided by the initial sale price. Although referred to as a profit value, in many embodiments, this may represent a gross profit value or return, not including expenses of the dynamic pricing system. In other embodiments, rather than calculating profit/sale price, the business margin may comprise a profit/sum of the net prices value, or a sale price/sum of the net prices value, or any similar value that may be used for comparing to thresholds for balancing a business margin against a customer discount. Accordingly, given an input of a predetermined retail price and a predetermined net price, various comparisons may be made to determine whether an intermediate sale price should be raised or lowered to meet business goals of the dynamic pricing system operator without departing from the scope of the invention. In some embodiments, the business margin may be calculated responsive to one or more additional values, including taxes; transaction or credit card fees; business overhead expenses such as salaries, rent, data storage prices, network service expenses, consulting fees, legal expenses, marketing and advertising expenses, materials, or other expenses; breakage or under-utilization of tickets, tokens, coupons, gift certificates or cards; or any other type and form of expense variable. The business margin may be calculated as an amount of currency, e.g. a dollar amount, or may be calculated as a percentage.

In many embodiments, an upper or lower business margin threshold may be predetermined by the operator of the dynamic pricing system. The lower and upper business margin thresholds may be set respectively responsive to (i) a minimum return necessary to run the dynamic pricing system and pay expenses; and (ii) a maximum return desired by the dynamic system operator, above which further returns may be passed on to the consumer as discounts. In some embodiments, the upper or lower business margin thresholds may be adjusted by the operator of the dynamic pricing system responsive to market demand, interest rates, monthly quotas, or other conditions. In one embodiment, only one threshold may be utilized. For example, the business margin may only be compared to a lower threshold without additional discounts being passed on to the consumer, although this may be less desirable for marketing reasons.

If the business margin is below a lower business margin threshold, then at step 436a, the initial sale price (or volume-discounted initial sale price) may be increased such that the business margin is equal to or greater than the lower business margin threshold. If the business margin is above an upper business margin threshold, then at step 436b, the initial sale price (or volume-discounted initial sale price) may be decreased such that the business margin is equal to or less than the upper business margin threshold. In either case, the adjusted result may comprise the intermediate price at step 438. In some embodiments, step 434 may be repeated after adjusting the adjusted initial sale price to recalculate the business margin. If the business margin is equal to one of or lies between the upper and lower business margin thresholds, then in some embodiments, the initial sale price or volume-discount-adjusted initial sale price may comprise the intermediate price at step 438.

Having adjusted the initial sale price or volume-discounted sale price responsive to the business margin thresholds to create the intermediate price at step 438, in many embodiments, the intermediate price may be further compared to or validated against the initial sale price. As discussed above, the initial sale price may represent the total retail price of the one or more items in the order, discounted by the target customer value. For some values of net prices and business margin thresholds, the initial sale price (or volume-discounted initial sale price) may have been increased at step 436a to a value such that the intermediate price is greater than the initial sale price. Therefore, if the items are sold at this intermediate price, the user would not receive the target customer value of discount compared to the retail price. Accordingly, in many embodiments, the intermediate price may be compared to the initial sale price at step 440a-440b to determine a final price 442. If the intermediate price is above the initial sale price, then at step 440a, the initial sale price may be used as the final price 442. If the intermediate price is equal to or below the initial sale price, then at step 440b, the intermediate price may be used as the final price 442. This may ensure that the customer receives at least a minimum target value.

As discussed above, in some embodiments utilizing a minimum volume type to prevent undercutting direct sales by vendors, if a request includes a number of items less than the minimum volume item (for example, if the request is to purchase only a single item), the item may be priced at the retail price of the item. Therefore, in such embodiments, it may be undesirable to perform the business margin comparisons and/or target customer value comparisons of steps 436-440. Accordingly, in a further embodiment of method 420, if no retail prices of items in the order were reduced at step 428a because the number of items in the order was below the minimum volume value for each item, then final price 442 may be set equal to the sum of the retail prices of the items.

At step 444, in some embodiments, the system may transmit a response to the request to purchase the plurality of items. In some embodiments, the system may transmit the response to a computing device of the user, while in other embodiments, the system may transmit the response to a computing device of a third party, such as a ticket agent or broker or customer service agent. In a further embodiment, the system may provide the user with an opportunity to purchase the one or more items at the final price 442, such as via a credit card, debit card, check, or other means.

C. Systems and Methods for Selling and Validating Access Tickets or Tokens

As discussed above, in many embodiments, the dynamic pricing system described herein may be used to purchase one or more items while leaving one or more terms or characteristics of the item unspecified. For example, in one such embodiment, a user may purchase an admission ticket to a museum or access pass to a nightclub, without specifying a day, time, or date of entry. As discussed above, in some embodiments, the item may be priced based on a highest net price for the item of a plurality of net prices identified as leaves in a hierarchical tree corresponding to one or more specified terms or characteristics of the item in the order and each variable value of the one or more unspecified terms or characteristics of the item in the order. For example, referring briefly back to the hierarchical tree illustrated in FIG. 3C, if the user specified in the request that the item was a child ticket, but did not specify a date range, day, or time, the dynamic pricing engine may identify the highest net price of $8 among the four leaves corresponding to child tickets. If instead the user specified that the ticket was an adult ticket, to be used on a Saturday, the dynamic pricing engine may identify the highest net price of $12 from the two leaves corresponding to adult tickets used on a Saturday. In other embodiments, different variables may be left unspecified, such as size or color of a clothing item or other good; shipping options, such as class of shipment; whether an item will be delivered or picked up; whether a software program will be downloaded or mailed on a CD or DVD; or any other type and form of variable. Accordingly, while the examples illustrated in FIGS. 3A-3C include temporal variables (e.g. date range, day, and time) and class variables (e.g. adult or child) for admission or access tickets, the concepts can apply equally to other variables that may be applicable to admission or access tickets, or may not be applicable (e.g. color, size, material, pattern, shipping, etc.). By basing price calculations off the highest net price, the dynamic pricing system allows for flexibility by the user while preserving business margin goals of the system operator.

When the item order is fulfilled (such as when the goods are shipped or otherwise delivered to the user, when the user uses the gift card or certificate, when the user accesses the attraction or event or otherwise uses the ticket or token, or at similar times), values that were unspecified by the user at the time of ordering may be fixed. Because these values must be fixed when the order is fulfill, these may be considered terms that are required to be specified for the order to be fulfilled. In some embodiments, the user may expressly specify the value prior to fulfillment, such as where the user determines that they want an item delivered or shipped first class as opposed to ground. In other embodiments, the value may be specified as a result of the user's actions, such as a time or date of access. Once the values are specified, the dynamic pricing system may determine an actual net price, which may be less than the net price identified during calculation of the sale price for the item. This actual net price may be provided to the item vendor, either immediately or at some point in the future according to a billing or payment agreement.

For example, still referring to FIG. 3C, in the example embodiment illustrated, if a user purchases an adult ticket without specifying a day or time of access, the dynamic pricing engine may use the highest leaf net price of $12 for calculating business margins and determining the sale price. If the user subsequently uses the ticket on a Monday, then only the actual net price of $8 may be due to the vendor. Accordingly, it may be desirable for the dynamic pricing system to include functionality for determining an actual net price when a term that was unspecified at the time of purchase becomes specified.

In other embodiments, an actual net price or net price due to the item vendor may be established at the time of sale, even when one or more terms have not been specified. For example, it may be desirable for the vendor's business objectives to have a fixed, predictable net price. Similarly, it may be desirable for the dynamic pricing system operator to have a fixed, predictable net price at time of sale so that they don't potentially have to pay a higher price to the vendor at time of usage. Accordingly, in some embodiments, if the user has not specified one or more terms required to establish a net price by finding a corresponding leaf in the hierarchical tree, the dynamic pricing system may use a predetermined default net price; an average of a plurality of net prices of corresponding leaves, such as one or more leaves corresponding to terms specified by the user during purchase; a highest net price of the net prices of corresponding leaves; a lowest net price of the net prices of corresponding leaves; or any other predetermined price. Thus, in such embodiments, the net price may be fixed at time of sale, rather than time of usage.

Furthermore, the same functionality for determining the actual net price may provide an ability to validate or verify an access or admission request where one or more terms were unspecified at the time of purchase and once specified, may be either valid or invalid. For example, a user may purchase an access ticket to an attraction without specifying a time or date of entry. The attraction may be accessible through an automated kiosk, an electronic gate, or other similar feature that allows the user to gain access upon inserting, scanning, dipping, or otherwise utilizing a valid ticket. For example, in one embodiment, the ticket may be a multiday access pass for a subway system, and the gate may be an automated gate that opens when the ticket is inserted into a reader. When the user inserts the ticket into the reader, the reader may send a validation request to the dynamic pricing system. In some embodiments, the validation request may indicate that the ticket was purchased with one or more terms unspecified, such as a day or time of entry. The dynamic pricing engine may search a hierarchical tree for a leaf or contract corresponding to (i) values for the ticket that were specified at time of purchase (such as an adult admission, or a destination city), and (ii) values for the ticket that are specified or fixed when the request is made or when the ticket is validated (such as a current timestamp or date). If a corresponding leaf exists, then the ticket is valid, and the dynamic pricing system may respond with a message indicating the ticket is valid. For example, still referring to the example shown in FIG. 3C, if a request is made to validate or allow access via an adult ticket that was purchased without a day or time specified, and the request is made at 8:00 AM on a Friday, no leaf corresponds to that combination of terms (the time range in 322c is from 9:00 AM to 3:00 PM). Accordingly, the system may respond that the request is invalid at this time. In a further embodiment, the response may indicate what value is needed for the ticket to be valid, such as indicating that the ticket will become valid at 9:00 AM.

In a similar example, a user may purchase a ticket to a matinee showing of a movie, without specifying the day or time of use, or even which movie or theater. When the user attempts to use the ticket, a request may be sent to the dynamic pricing system, which may search a hierarchical tree for a leaf corresponding to a matinee ticket at the time and day of the request. If the request is made at a time when a regular movie is showing rather than a matinee, then the hierarchical tree may have no leaf corresponding to a matinee ticket at that time, and the dynamic pricing system may properly respond that the ticket is not valid or that access should not be allowed.

Figure 5A:
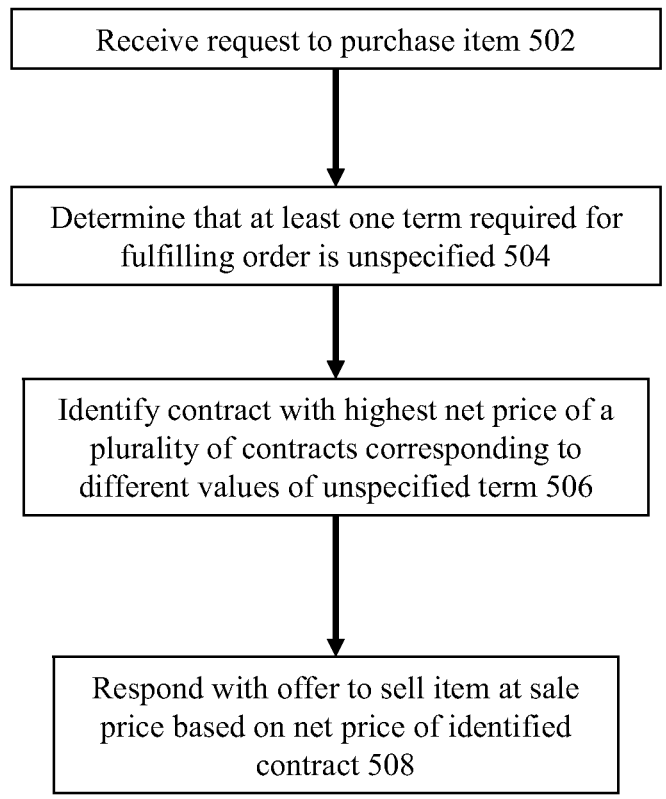
FIG. 5A is a flow chart of an embodiment of a method of selling an access ticket with an unspecified term.

Referring now to FIG. 5A, illustrated is a flow chart of an embodiment of a method 500 of selling an item with an unspecified term. In brief overview, at step 502, the server may receive a request to purchase an item. At step 504, the dynamic pricing system may determine that at least one term required for fulfilling the order is unspecified. At step 506, the dynamic pricing system may identify a contract or leaf with a highest net price of a plurality of contracts or leaves corresponding to different values of the unspecified at least one term. At step 508, the dynamic pricing system may respond with an offer to sell the item at a sale price based on the net price of the identified contract or leaf.

Still referring to FIG. 5A and in greater detail, at step 502, the server may receive a request to purchase an item. The request may be received using any of the methods or systems discussed herein. In some embodiments, the request may comprise an API request, a data request, a submitted query form such as an HTML GET or POST request, or any other type and form of request. In some embodiments, the request may be received via a network communication from a computing device used by the user, such as a desktop computer, laptop computer, tablet computer, smartphone, or other device. In some such embodiments, the request may be made through a web application or form, while in other such embodiments, the request may be made through a dedicated application. In some embodiments, the request may specify a first one or more terms for the item, such as class, size, type, time, date, day, month, duration, color, delivery or shipment method, or any other characteristic of the item. In many embodiments, the request may not specify a second one or more terms. The second one or more terms may be required to be fixed, specified, or otherwise established in order to fulfill the purchased order, such as any of the terms mentioned above. Terms may be fixed explicitly, such as the purchaser specifying a value of the term at time of fulfillment of the order, or terms may be fixed implicitly, such as a timestamp or date of access. In some embodiments, the item may be an access ticket to an attraction or an event, a theater ticket, a movie ticket, a museum admission, an access token to an online application or multiplayer game, a book, clothing, an electronic book, a gift card, a gift certificate, or any other type and form of item discussed herein.

At step 504, in some embodiments, a dynamic pricing engine may determine that at least one term required for fulfilling the order is unspecified. In some embodiments, the request may explicitly identify that at least one required term is unspecified. In other embodiments, the dynamic pricing engine may inspect the request to identify that a required term is missing or unspecified. In still other embodiments, the dynamic pricing engine may search a hierarchical tree for a leaf (sometimes referred to as a contract) corresponding to the request using one or more terms specified in the request. In one such embodiment, if the dynamic pricing engine only finds a single leaf corresponding to the terms specified in the request, then no additional terms are required to be specified. Conversely, if the dynamic pricing engine finds a plurality of leaves or contracts corresponding to the terms specified in the request, then any terms with values that vary between the leaves may be required to be specified for the order to be fulfilled. Searching the hierarchical tree may be performed using any search algorithm.

At step 506, in some embodiments, the dynamic pricing engine may identify a leaf or contract with the highest net price of a plurality of leaves or contracts corresponding to the terms specified in the request and different values of the unspecified term. In some embodiments, identifying the leaf with the highest net price may comprise comparing each net price of a plurality of leaves to determine the leaf with the highest net price. In some embodiments, the highest net price may be shared by multiple leaves with the same net price. In such embodiments, the dynamic pricing engine may identify either leaf, or may otherwise retrieve the net price from either leaf.

At step 508, in some embodiments, the dynamic pricing engine may respond to the request with an offer to sell the item at a sale price based on the net price of the identified leaf. In other embodiments, the dynamic pricing engine may respond to the request with an offer to sell the item at a sale price based on the highest net price identified in the plurality of contracts. In many embodiments, the sale price may be determined according to method 420, discussed above.

Figure 5B:
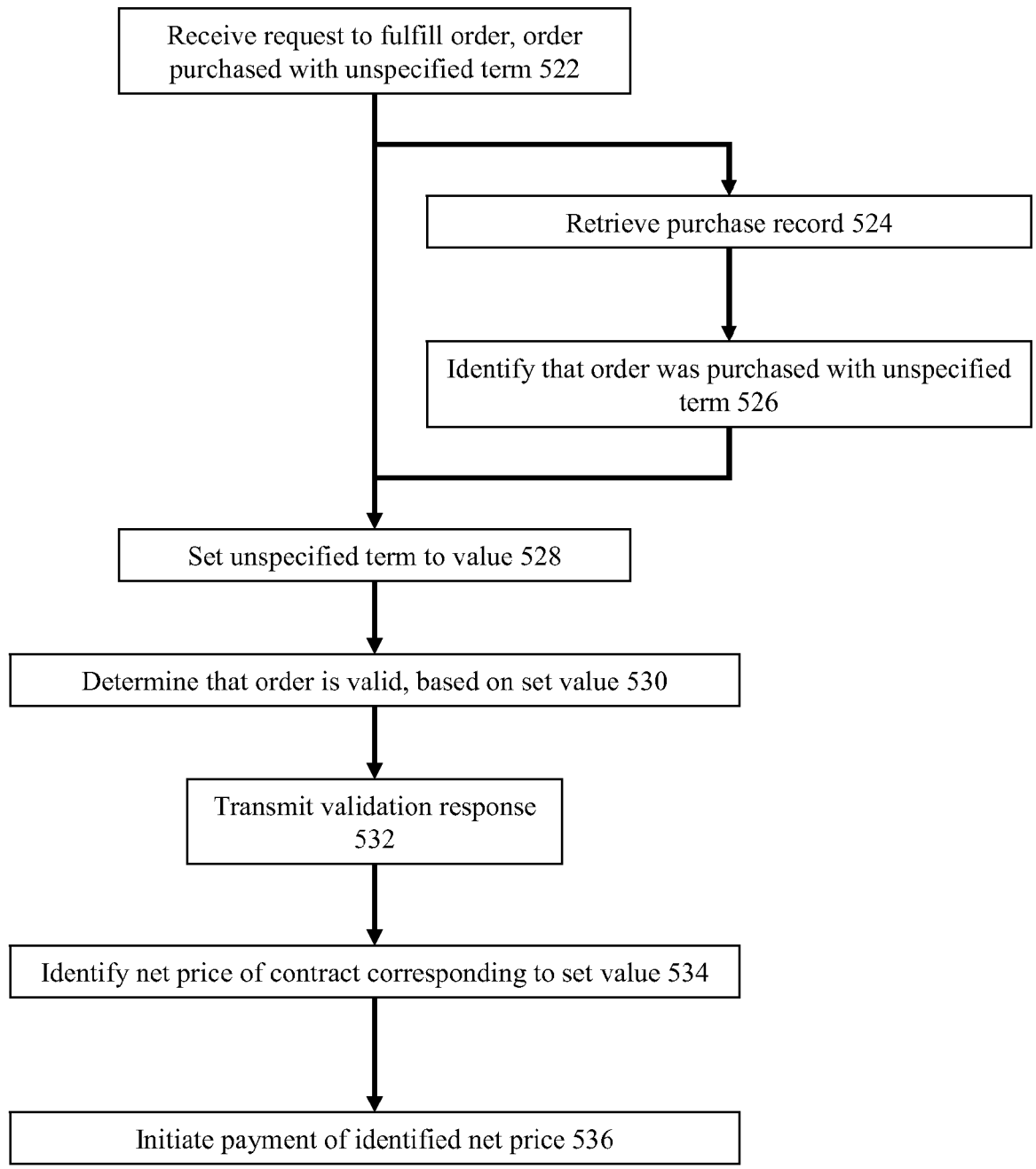
FIG. 5B is a flow chart of an embodiment of a method of validating an access ticket with an unspecified term.

Referring now to FIG. 5B, illustrated is a flow chart of an embodiment of a method 520 of validating an order purchased with an unspecified term. In some embodiments, the order may comprise an order for an access ticket or admission ticket or access token. In such embodiments, validation may comprise determining the ticket or token is valid and/or allowing access based on a determined value for an access term unspecified at the time of purchase. In other embodiments, the order may comprise an order for goods or services. In such embodiments, validation may comprise determining that the order is valid and fulfilling the order based on a determined or specified value for a term unspecified at the time of purchase.

At step 522, a validation system may receive a request to fulfill or validate an order, the order having been purchased with at least one unspecified term required to be specified to fulfill or validate the order. In some embodiments, the request may indicate that the order was purchased with at least one unspecified term. For example, the request may identify the one or more terms that were unspecified. In other embodiments, the request may only identify the order. For example, the request may include an order number or purchase number or another identifier to uniquely identify the order. The identifier may be encoded in a bar code, data matrix code, magnetic strip, or other marking system. In such embodiments, at step 524, the validation system may retrieve an order or purchase record associated with the identifier and, at step 526, identify that the order was purchased with the at least one unspecified term.

At step 528, the validation system may set the at least one unspecified term or terms to a value. In some embodiments, the validation system may retrieve the value from a counter, timer or other service. For example, in one embodiment in which the unspecified term is a time, the validation system may retrieve a timestamp from a timer or time server. In embodiments in which the unspecified term is a destination name, event name, venue name, attraction name, or other similar characteristic, the validation system may retrieve or receive the value from the requestor. For example, in one such embodiment, the user may have purchased an admission ticket to three museums, but did not specify at the time of purchase which of a larger number of museums the user will visit. The user may then visit a museum and scan a barcode or other identifier on the ticket via an automated gate, kiosk, customer service computing device, or other device. The device may transmit a request to validate the ticket to the validation system. In some embodiments, the device may transmit an identifier of the location, such as the museum name, address, or an identifier associated with the location. In some embodiments, the device may transmit the identifier responsive to a request for the identifier from the validation system.

Based on the set value or values for the at least one unspecified term or terms, at step 530, the validation system may determine if the order is valid. Determining if the order is valid may comprise searching a hierarchical tree for a leaf corresponding to one or more values specified by the user at the time of purchase and identified in the request or the purchase record, and corresponding to the set value or values for the at least one unspecified term or terms not specified by the user at the time of purchase. As discussed above, once every required term is specified or set, either (i) no leaves will correspond to the specified or set values or (ii) a single leaf will correspond to the specified or set values. Accordingly, the validation system will be able to determine, respectively, that the order is (i) not valid, or (ii) is valid.

At step 532, the validation system may transmit a validation response, responsive to the determination. In some embodiments, transmitting a validation response may comprise transmitting a response indicating the order is not valid. In a further embodiment, the response may indicate a variable that must be changed to be valid, such as a future time of entry when the order will become valid. In other embodiments, transmitting a validation response may comprise transmitting a response indicating the order is valid. In a further embodiment, the response may indicate to allow access to an attraction or event or other location. For example, in one embodiment in which the order is for an airline ticket, the response may indicate that the purchaser may board the aircraft.

At step 534, in some embodiments in which the order is determined to be valid, the validation system may identify the net price in the leaf or contract corresponding to one or more values specified by the user at the time of purchase and identified in the request or the purchase record, and corresponding to the set value or values for the at least one unspecified term or terms not specified by the user at the time of purchase. At step 536, in some embodiments, the validation system may initiate payment of the identified net price to the vendor of the item for which the order was validated. In some embodiments, initiating payment may comprise directing an accounts payable or payment system to initiate payment to the vendor. In other embodiments, initiating payment may comprise adding an indicator of the net price due to a payment record for the vendor, such that a future payment may include payment of the net price for the item. Payment may be completed immediately, or at a predetermined or periodic future time.

Figure 5C:
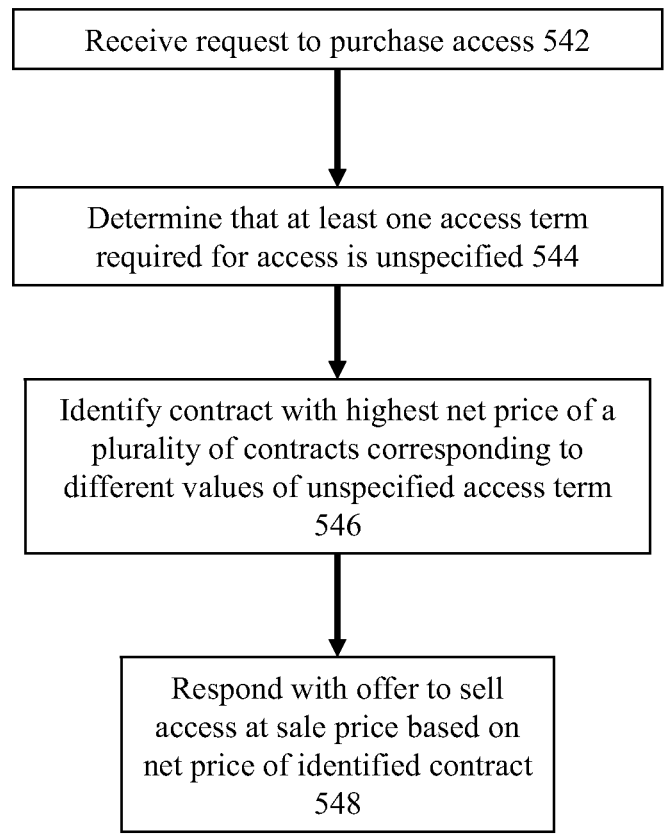
FIG. 5C is a flow chart of an embodiment of a method of selling an access token with an unspecified term.

Referring now to FIG. 5C, illustrated is a flow chart of an embodiment of a method 540 of selling an access token or ticket with an unspecified term. At step 542, the server or dynamic pricing system may receive a request to purchase an access ticket or token to an event, attraction, venue, transportation service, remote application, cloud computing service, or any other similar service, location, or occurrence. The request may be received using any of the methods or systems discussed herein. In some embodiments, the request may comprise an API request, a data request, a submitted query form such as an HTML GET or POST request, or any other type and form of request. In some embodiments, the request may be received via a network communication from a computing device used by the user, such as a desktop computer, laptop computer, tablet computer, smartphone, or other device. In some such embodiments, the request may be made through a web application or form, while in other such embodiments, the request may be made through a dedicated application. In some embodiments, the request may specify a first one or more access terms, such as a ticket class, type, time, date, day, month, duration, or any other access term. In many embodiments, the request may not specify a second one or more access terms. The second one or more access terms may be required to be fixed, specified, or otherwise established in order to allow access, such as any of the terms mentioned above. Terms may be fixed explicitly, such as the purchaser specifying a value of the term at time of fulfillment of the order, or terms may be fixed implicitly, such as a timestamp or date of access.

At step 544, the dynamic pricing system may determine that at least one term required for access is unspecified, such as an access time or date. In some embodiments, the request may explicitly identify that at least one required access term is unspecified. In other embodiments, the dynamic pricing engine may inspect the request to identify that a required access term is missing or unspecified. In still other embodiments, the dynamic pricing engine may search a hierarchical tree for a leaf or contract corresponding to the request using one or more access terms specified in the request. In one such embodiment, if the dynamic pricing engine only finds a single leaf corresponding to the access terms specified in the request, then no additional access terms are required to be specified. Conversely, if the dynamic pricing engine finds a plurality of leaves or contracts corresponding to the access terms specified in the request, then any access terms with values that vary between the leaves may be required to be specified for the order to be fulfilled. Searching the hierarchical tree may be performed using any search algorithm.

At step 546, the dynamic pricing system may identify a contract or leaf with a highest net price of a plurality of contracts or leaves corresponding to different values of the unspecified at least one access term. In some embodiments, identifying the leaf with the highest net price may comprise comparing each net price of a plurality of leaves to determine the leaf with the highest net price. In some embodiments, the highest net price may be shared by multiple leaves with the same net price. In such embodiments, the dynamic pricing engine may identify either leaf, or may otherwise retrieve the net price from either leaf.

At step 548, the dynamic pricing system may respond with an offer to sell the access ticket or token at a sale price based on the net price of the identified contract or leaf. In other embodiments, the dynamic pricing engine may respond to the request with an offer to sell the access ticket or token at a sale price based on the highest net price identified in the plurality of contracts. In many embodiments, the sale price may be determined according to method 420, discussed above.

Figure 5D:
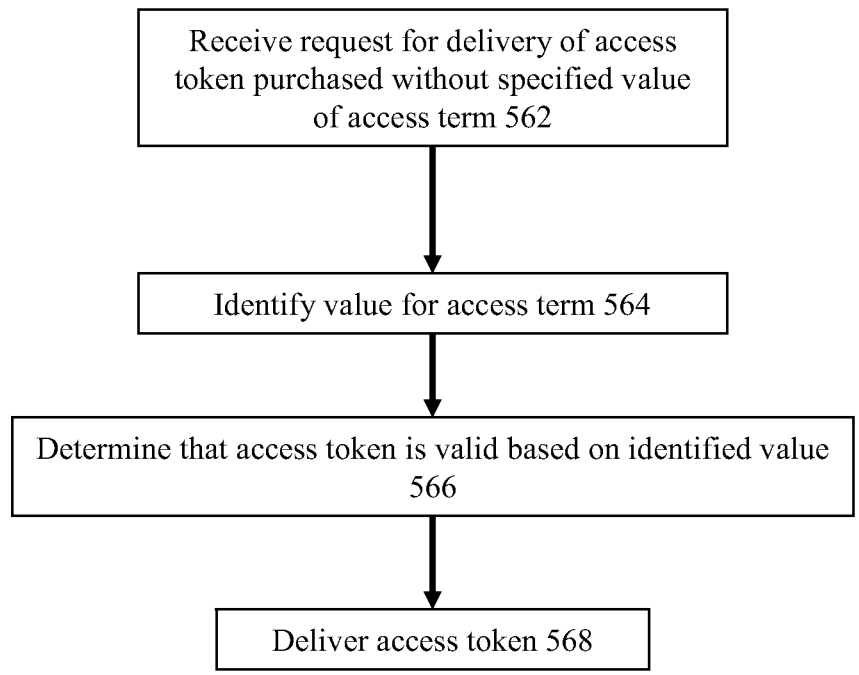
FIG. 5D is a flow chart of an embodiment of a method of delivering an access token with an unspecified term.

Referring briefly to FIG. 5D, illustrated is a flow chart of an embodiment of a method 560 of delivering an access token purchased with an unspecified term. For example, the access token may comprise a cookie, token, certificate, password, or other identifier allowing access to a service, such as a cloud computing service, web application, remote server, or other service. In other embodiments, the access token may comprise a message indicating that a purchaser should be allowed access to something. For example, the access token may be a message sent to unlock an automatic gate, indicate to an agent that the purchaser should be allowed to pass, or otherwise allow access. Accordingly, the access provided when the access token is delivered may be physical or virtual access. Similar to the unspecified terms in the methods discussed above, the unspecified term may be a term that is required for access, such as a time of access or day of access.

At step 562, an access validation system may receive a request for delivery of an access token purchased without a specified value for one or more access terms. In some embodiments, the request may explicitly identify the one or more unspecified access terms, while in other embodiments, the request may be silent regarding the unspecified access terms. In a further embodiment, the request may include a unique identifier. The access validation system may use the unique identifier to retrieve an associated purchase record from a purchase database, the purchase record identifying the one or more unspecified access terms.

At step 564, the access validation system may identify a value for the one or more unspecified access terms. In some embodiments, identifying a value may comprise retrieving a value for the term, such as a timestamp value, a date value, a day value, an account balance, or a counter value. In other embodiments, identifying a value may comprise identifying a value included in the request. For example, in one such embodiment, the request may indicate that the access token was previously purchased without a time of entry, and may further include a desired access time or a current time at which access is being attempted or validation is being requested.

At step 566, the access validation system may determine whether the access token is valid, based on the identified value or values for the one or more access terms. As discussed above, determining whether the access token is valid may comprise searching a hierarchical tree for a leaf corresponding to the identified value or values for the one or more access terms. The leaf may further correspond to one or more access terms that were specified at time of purchase. If no leaf is found, then in some embodiments, the validation system may respond to the request indicating that the access token is invalid. In a further embodiment, the validation system may indicate a value or values for the one or more unspecified access terms that may be required for the token to be valid, such as a time at which the token is valid or a minimum account balance.

If a leaf is found, the validation system may determine the access token is valid. Responsive to the determination, at step 568, the access validation system may deliver the requested access token. In some embodiments, delivering the access token may comprise transmitting a token, cookie, password, pass code, certificate, string, or other data to the requestor or a third party. In other embodiments, delivering the access token may comprise indicating to an agent that the requestor should be granted access.

D. Systems and Methods for Dynamic Pricing of an Extended Order or Offer

As discussed above, in many embodiments, the systems and methods described herein may be used to provide discounted pricing to an order comprising a plurality of items, and may determine a sale price for a consumer that is balanced against one or more business margin thresholds of the dynamic pricing system operator. In a further embodiment, discounted pricing may be extended to orders or offers purchased or accepted after the initial purchase, and in some cases, after the order or offer has been fulfilled or access granted based on the order. For example, as discussed above, in some embodiments a user may request to purchase a ticket for access to three attractions, such as museums, clubs, or similar events. Using the dynamic pricing system to balance net prices for each attraction with overall business thresholds, along with optional volume discounts, a discounted sale price may be determined for a ticket allowing access to all three attractions. The user may visit one or more of the museums, and then decide that they wish to add an additional attraction to the ticket. If the user simply purchases a new ticket for the single attraction, volume discounts can not be applied because there is only one item in the order, and a business margin can not take advantage of greater margins on individual items in the order to provide further discounts to the user. However, by having the new purchase relate back to the original purchase, as if it were made at the same time, the sale price for the ticket may be dynamically recalculated, and a cost difference identified for the user to pay to add the additional item. This may result in increased discounts, as well as providing the user with greater flexibility.

Furthermore, extending dynamic pricing may allow for up selling or cross-selling opportunities. For example, a user who purchased a lift ticket to a ski resort may arrive and realize that they've forgotten their skis, or need new gloves, or wish to purchase a day pass for a spa. The user may be further encouraged to make a new purchase or rental if they can add these items to the previously-purchased order of the lift ticket, to take advantage of volume discounts and discounts responsive to business margin thresholds.

Similarly, in some embodiments, offers to purchase items using an extended dynamic pricing incorporating a previously purchased item or items may be sent to the user. The offers may be responsive to a purchase history or history of similar purchases by other users. For example, if users who purchase a first item, such as a ticket to a football game, frequently purchase a second item, such as a pre-paid parking pass, pre-paid concessions, a ticket to a later game, a team jersey, or other items, offers to purchase these items using extended dynamic pricing may be provided to purchasers of the first item.

In other embodiments, up-selling or cross-selling opportunities may be provided based on a location. For example, when a user purchases access to a first attraction, an offer may be provided to purchase access to nearby attractions using extended dynamic pricing. In some embodiments, the offer may be extended to the user when they access the first attraction. For instance, in one such embodiment in which a city tour departure point is next to a local attraction, such as an aquarium, when a user who has purchased access to the aquarium uses their ticket, an offer may be provided to the user to immediately purchase a ticket to the nearby tour at a discounted price that incorporates volume discounting and net price balancing from their previous purchase of the aquarium ticket. In another embodiment, a location service of a mobile computing device may be used to detect a user location, and offers to purchase tickets to an attraction at an extended discount price may be transmitted to the user's mobile computing device when the user is in proximity to the attraction.

Accordingly, in many embodiments in which a user purchases an access ticket to one or more attractions, events, services, or similar items, the user may provided with a single ticket, while retaining the flexibility to add additional attractions, events, services or similar items to the ticket. In some embodiments, the user may even remove previously purchased items from the ticket and receive a credit or refund for the price difference, or replace previously purchased items from the ticket with new items. Accordingly, a single ticket may be used for access to multiple venues. In some embodiments, the ticket may comprise a card or pass encoded with magnetic or optical data or a smartcard or radio-frequency identification (RFID) card or pass encoded with data that uniquely identifies the ticket. In other embodiments, the ticket may comprise a bar code or data code delivered to the user electronically, such as via an email or application. In a further embodiment, the ticket may be retrieved or the code may be displayed on a mobile computing device, such as a smartphone, for reading by an optical scanner. In one embodiment, the ticket may include an expiration date or term that the user can add or remove purchases from the ticket, or a period during which any purchased access must be used. This may be done for accounting purposes so that revenue may be realized. In one such embodiment, the expiration date or term may be a month, six months, a year, or any other period, and may be calculated from the date of first purchase, the date of first access, or any other time period.

Figure 6:
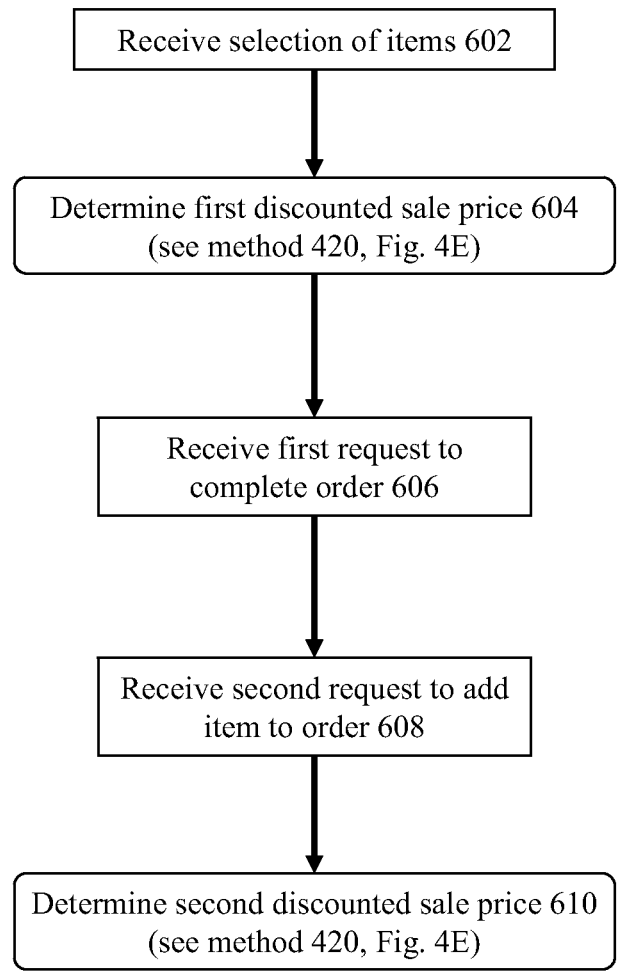
FIG. 6 is a flow chart of an embodiment of a method of extending discounted pricing of an order to items added to the order after purchase of the order.

Referring now to FIG. 6, illustrated is a flow chart of an embodiment of a method 600 of extending discounted pricing of an order to items added to the order after purchase of the order. In brief overview, at step 602, a dynamic pricing system may receive a selection of one or more items to be purchased by a user. At step 604, the dynamic pricing system may determine a first discounted sale price to purchase the selected one or more items. At step 606, the dynamic pricing system may receive a first request to complete the order. At step 608, the dynamic pricing system may receive a second request to add an item to the order. At step 610, the dynamic pricing system may determine a second discounted sale price for the order.

Still referring to FIG. 6 and in more detail, at step 602, the dynamic pricing system may receive a selection of a first one or more items to be purchased by a user. In some embodiments, receiving the selection of the first one or more items may comprise receiving a request to purchase the first one or more items, as discussed above. At step 604, the dynamic pricing system may determine a first discounted sale price for the first one or more items. In many embodiments, determining the first discounted sale price may comprise performing an embodiment of method 420, discussed above.

At step 606, the dynamic pricing system may receive a first request to complete the order at the first discounted sale price. In some embodiments, and responsive to the first request, the dynamic pricing system may complete the order at the first discounted sale price. Completing the order may comprise completing a purchase transaction, charging the user, billing the user, and/or delivering the one or more items as discussed above. In many embodiments, the order may be completed or purchased, but not yet fulfilled. For example, as discussed above, in embodiments in which the item is delivered at a future date or is access to an attraction or service, the order may be completed by charging the user, even though the user has not yet accessed the attraction or the item has not yet been fulfilled.

At a subsequent time, the dynamic pricing system may receive a second request to add a second one or more items to the order at step 608. In some embodiments, the second request may be generated or initiated by the user. In other embodiments, such as where the system identifies a possible up-sell or cross-sell opportunity, the second request may be generated or initiated by the dynamic pricing system. In some embodiments, the second one or more items may be determined responsive to a location of the user, such as a location determined via a mobile computing device or determined when the user accesses an attraction at a known location. In other embodiments, the second one or more items may be determined responsive to selections or purchases made by other users who also selected the first one or more items.

In many embodiments, the subsequent time may be after the user has received, accessed, or otherwise utilized one or more of the first one or more items. For example, the subsequent time may be after the user has used an access ticket to an attraction that was selected as one of the first one or more items, or the subsequent time may be after the user has received a book that was one of the first one or more items. In other embodiments, the subsequent time may be after the user has been billed or has paid for the order at step 606.

At step 610, the dynamic pricing system may determine a second discounted sale price. In some embodiments, determining the second discounted sale price may comprise retrieving a purchase record of the order including the first one or more items. The dynamic pricing system may determine the second discounted sale price based on a purchase of the first one or more items and the second one or more items, using any of the embodiments of method 420 discussed above. The second discounted sale price may comprise a sale price for the first one or more items and the second one or more items, minus the first discounted sale price. Accordingly, the second discounted sale price may represent a difference between the sale price for the first one or more items already paid by the user, and the sale price for the first one or more items and the second one or more items. In some embodiments, the dynamic pricing system may present to the user an offer to purchase the second one or more items at the second discounted sale price.

As discussed above, in some embodiments, the items may comprise goods such as books, clothing, software, electronic items, electronic books, toys, gift certificates, or other tangible or intangible goods. In other embodiments, the items may comprise admissions to events such as concerts or theater shows, attractions such as museums or amusement parks, or services, such as tours, travel tickets, restaurant reservations, or other similar services or attractions.

Figure 7:
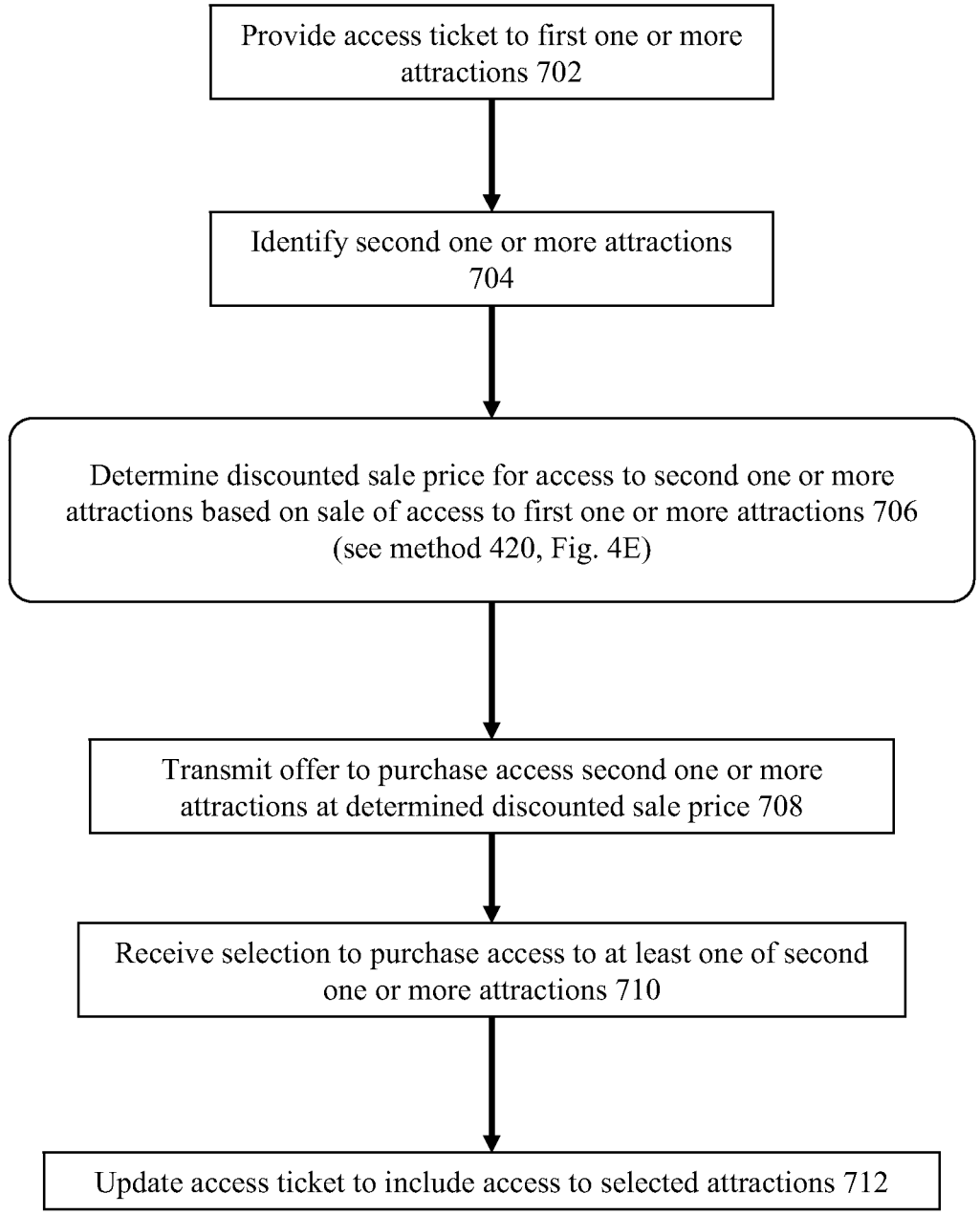
FIG. 7 is a flow chart of an embodiment of a method of offering a new attraction to add to an access ticket.

Illustrated in FIG. 7 is a flow chart of an embodiment of a method 700 of offering a new attraction to add to an access ticket. In brief overview, at step 702, a dynamic pricing system may provide an access ticket to a first one or more attractions. At step 704, a second one or more attractions may be identified. At step 706, a discounted sale price for access to the second one or more attractions may be determined, based on the sale price or retail and net prices of access to the first one or more attractions. At step 708, an offer to purchase access to the second one or more attractions at the determined discounted sale price may be transmitted to the user or consumer. At step 710, the dynamic pricing system may receive a selection to purchase access to at least one of the second one or more attractions. At step 712, the access ticket may be updated to include access to the selected attractions.

Still referring to FIG. 7 and in more detail, at step 702, a dynamic pricing system may provide an access ticket to a first one or more attractions. As discussed above, the access ticket may comprise a card, smartcard, or electronic ticket, or any other type and form of access ticket. The access ticket may be provided responsive to the user purchasing access to the first one or more attractions, as discussed above.

At step 704, a second one or more attractions may be identified. In one embodiment, the dynamic pricing system or a sales engine may identify the second one or more attractions. In some embodiments, such identification may be responsive to other users who purchased access to the first one or more attractions also purchasing access to the second one or more attractions, or such identification may be responsive to geographical proximity, attraction similarity, or any other similar characteristics. In other embodiments, such identification may be responsive to the user accessing an attraction of the first one or more attractions that is in geographical proximity to an attraction in the second one or more attractions. In another embodiment, the purchaser of the access ticket may identify a second one or more attractions. The identification may be performed at a time subsequent to when the purchaser was provided with the access ticket to the first one or more attractions.

At step 706, the dynamic pricing engine may determine a discounted sale price for access to the second one or more attractions. Determining the discounted sale price may comprise retrieving a purchase record for the previously purchased access ticket, and/or retrieving a previous sale price paid by the purchaser or user. The discounted sale price may be based on the sale price, or net prices and retail prices of the first one or more attractions, as well as the net prices and retail prices of the second one or more attractions. The discounted sale price may be determined using any of the embodiments of method 420, discussed above. In many embodiments, the discounted sale price may comprise a difference between a previously paid purchase price for the access ticket and a sale price determined via method 420. Accordingly, the discounted sale price may comprise a price to add access to the second one or more attractions to the access ticket.

At step 708, an offer to purchase access to the second one or more attractions at the determined discounted sale price may be provided to the purchaser or user. In many embodiments, the offer may be delivered via an email, text message, voice message, application alert, popup message, or other means. In a further embodiment, the offer may indicate the discounted sale price, as well as a non-discounted or full retail price of access to the second one or more attractions, to show the potential savings by the user.

At step 710, the dynamic pricing system may receive a selection from the purchaser or user to purchase access to at least one of the second one or more attractions. In some embodiments in which the user or purchaser selects purchase of all of the second one or more attractions, the user or purchaser may be charged the determined discounted sale price. In other embodiments in which the user or purchaser selects fewer than all of the second one or more attractions, the dynamic pricing system may re-determine the discounted sale price based on the selected at least one of the second one or more attractions.

At step 712, the dynamic pricing system may update the access ticket to include access to the selected at least one of the second one or more attractions. In some embodiments, updating the access ticket may comprise updating a purchase record associated with the access ticket. For example, in embodiments where the access ticket is delivered to the user as a bar code or data code or other unique identifier, the dynamic pricing system may update a purchase record associated with the unique identifier to indicate that the user has purchased access to the selected at least one of the second one or more attractions. In some embodiments, the dynamic pricing system may further charge the user the discounted sale price. Charging the user may comprise deducting the discounted sale price from a stored user credit, such as where the user has removed a previously purchased item from an order. In other embodiments, charging the user may comprise charging a user's credit card, billing the user, or otherwise receiving payment from the user.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed:

1. A method of validating an access ticket to an attraction, the method comprising:
    receiving, by a first device, a request to validate an access ticket to an attraction, the request including a ticket identification and an attraction identification, the access ticket having been purchased with at least one unspecified access term;
    setting, by a validation engine executed by the first device, responsive to receiving the request, a data value for the at least one unspecified access term;
    determining, by the validation engine and based on the set data value for the at least one unspecified access term, that access is permitted to the attraction identified by the attraction identification;
    transmitting, by the first device and responsive to the determination, a validation response to validate the access ticket to the attraction; and
    determining to pay a predetermined net price to an operator of the attraction, the predetermined net price based on the set data value for the at least one unspecified access term.

2. The method of claim 1, further comprising:
    retrieving, by the validation engine, a purchase record associated with the ticket identification; and
    identifying, by the validation engine, from the purchase record, that the ticket was purchased without specifying a data value for the at least one unspecified access term.

3. The method of claim 1, wherein a specified data value for the at least one unspecified access term is required for validation.

4. The method of claim 1, wherein the at least one unspecified access term comprises an undefined entry time, an undefined entry day of the week, or an undefined entry date.

5. The method of claim 1, further comprising storing, in a purchase record associated with the ticket identification, an indicator that the access ticket has been used to access the attraction.

6. The method of claim 1,
    wherein determining that access is permitted to the attraction comprises determining that an access contract including the set data value for the at least one unspecified access term exists for the attraction identified by the attraction identifier.

7. The method of claim 1,
    wherein determining that access is permitted to the attraction comprises determining that an access contract including the set data value for the at least one unspecified access term exists for the attraction identified by the attraction identifier; and
    wherein determining that an access contract including the set data value for the at least one unspecified access term exists comprises searching a hierarchical tree for a leaf node corresponding to the set data value for the at least one unspecified access term.

8. The method of claim 7, wherein the at least one unspecified access term comprises an entry time and the set data value for the entry time is the current time, and wherein the leaf node of the hierarchical tree includes a start time and an end time defining a time range including the current time.

9. The method of claim 7, wherein the hierarchical tree is based on one or more access terms defining nodes, the access terms including a time range of the contract, a day of the week of the contract, and a date range of the contract.

10. A method of delivering an access token, comprising:
    receiving, by a first device, a request for delivery of an access token, the access token purchased without specifying a data value of an access term, validity of the access token dependent on the data value of the access term;
    identifying, by the first device and responsive to receipt of the request, the data value for the access term;
    determining, by the first device and based on the identified data value for the access term, that the access token is valid;
    delivering, by the first device and responsive to the determination, the access token; and
    determining to pay a predetermined net price to an operator corresponding to the access token, the predetermined net price based on the identified data value for the access term.

11. The method of claim 10, wherein receiving a request for delivery of an access token comprises receiving a request for access to a location or service.

12. The method of claim 10, wherein the access term comprises one of a time of access, a day of access, and a date of access.

13. The method of claim 10, wherein identifying the data value for the access term comprises identifying a current data value for the access term.

14. The method of claim 10, wherein identifying the data value for the access term comprises receiving the data value for the access term, the data value set subsequent to purchase of the access token.

15. The method of claim 10, wherein determining that the access token is valid comprises determining that the identified data value falls within a first predetermined range.

16. The method of claim 15, wherein the predetermined range is identified in an access contract.

17. The method of claim 10, wherein determining that the access token is valid comprises identifying a first access contract of a plurality of access contracts, the first access contract comprising a predetermined range including the identified data value.

18. The method of claim 10, wherein the access token comprises an approval for access to a location or service.

19. The method of claim 10, further comprising:
    receiving, by the first device, a second request for delivery of a second access token, the second access token purchased without specifying the data value of the access term;
    identifying, by the first device and responsive to receipt of the second request, a second data value for the access term;
    determining, by the first device and based on the identified second data value for the access term, that the access token is invalid; and
    denying, by the first device and responsive to the determination, delivery of the second access token.

20. A system for validating an access ticket to an attraction, the system comprising:
- a first device executing a validation engine, the first device configured to: (i) receive a request to validate an access ticket to an attraction, the request including a ticket identification and an attraction identification, the access ticket having been purchased with at least one unspecified access term; and (ii) transmit a validation response to validate the access ticket to the attraction; and
- the validation engine configured to:
- set a data value for the at least one unspecified access term, and
- determine, based on the set data value for the at least one unspecified access term, that access is permitted to the attraction identified by the attraction identification; and
- wherein the first device is further configured to initiate payment of a predetermined net price to an operator of the attraction, the predetermined net price based on the set data value for the at least one unspecified access term.

21. The system of claim 20, wherein the validation engine is further configured to:
- retrieve a purchase record associated with the ticket identification; and
- identify, from the purchase record, that the ticket was purchased without specifying a data value for the at least one unspecified access term.

22. The system of claim 20, wherein a specified data value for the at least one unspecified access term is required for validation.

23. The system of claim 20, wherein the at least one unspecified access term comprises an undefined entry time, an undefined entry day of the week, or an undefined entry date.

24. The system of claim 20, wherein the validation engine is further configured to store, in a purchase record associated with the ticket identification, an indicator that the access ticket has been used to access the attraction.

25. The system of claim 20, wherein the validation engine is further configured to:
- determine that an access contract including the set data value for the at least one unspecified access term exists for the attraction identified by the attraction identifier.

26. The system of claim 20, wherein the validation engine is further configured to:
- determine that an access contract including the set data value for the at least one unspecified access term exists for the attraction identified by the attraction identifier, and
- search a hierarchical tree for a leaf node corresponding to the set data value for the at least one unspecified access term.

27. The system of claim 26, wherein the at least one unspecified access term comprises an entry time and the set data value for the entry time is the current time, and wherein the leaf node of the hierarchical tree includes a start time and an end time defining a time range including the current time.

28. The system of claim 26, wherein the hierarchical tree is based on one or more access terms defining nodes, the access terms including a time range of the contract, a day of the week of the contract, and a date range of the contract.

29. A non-transitory computer readable medium having instructions encoded thereupon that, when executed by a processor of a computing device, cause the processor to perform operations comprising:
- receiving a request to validate an access ticket to an attraction, the request including a ticket identification and an attraction identification, the access ticket having been purchased with at least one unspecified access term;
- setting responsive to receiving the request, a data value for the at least one unspecified access term;
- determining, based on the set data value for the at least one unspecified access term, that access is permitted to the attraction identified by the attraction identification;
- transmitting, responsive to the determination, a validation response to validate the access ticket to the attraction; and
- determining to pay a predetermined net price to an operator of the attraction, the predetermined net price based on the set data value for the at least one unspecified access term.

* * * * *